United States Patent
Kotake

(10) Patent No.: US 8,682,106 B2
(45) Date of Patent: Mar. 25, 2014

(54) METHOD AND APPARATUS FOR MEASURING POSITION AND ORIENTATION OF AN OBJECT

(75) Inventor: Daisuke Kotake, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 907 days.

(21) Appl. No.: 12/138,819

(22) Filed: Jun. 13, 2008

(65) Prior Publication Data

US 2009/0022365 A1 Jan. 22, 2009

(30) Foreign Application Priority Data

Jun. 14, 2007 (JP) ................. 2007-157609

(51) Int. Cl.
*G06K 9/36* (2006.01)
*G06K 9/46* (2006.01)
*G06T 15/00* (2011.01)

(52) U.S. Cl.
USPC ........... 382/285; 382/203; 382/289; 382/291; 345/419

(58) Field of Classification Search
USPC .................. 382/154; 345/418–421
See application file for complete search history.

(56) References Cited

U.S. PATENT DOCUMENTS

| | | | | |
|---|---|---|---|---|
| 5,528,194 A | * | 6/1996 | Ohtani et al. | 382/293 |
| 2002/0110275 A1 | * | 8/2002 | Rogina et al. | 382/154 |
| 2006/0227211 A1 | * | 10/2006 | Kotake et al. | 348/141 |
| 2007/0081695 A1 | * | 4/2007 | Foxlin et al. | 382/103 |

FOREIGN PATENT DOCUMENTS

| | | |
|---|---|---|
| JP | 2004-108836 A | 4/2004 |
| JP | 2006-292417 A | 10/2006 |

OTHER PUBLICATIONS

Georgiev A et al, "Localization Methods for a Mobile Robot in Urban Environments", IEEE Transactions on Robotics, IEEE Service Center, Piscataway, NJ, US vol. 20, No. Oct. 1, 2004, pp. 851-864 XP011119599.

Klein G et al: Robust Visual Tracking for non-instrumental augmented reality, Mixed and Augmented Reality,The second IEEE and AC M International Symposium Oct. 7-10, 2003, Piscataway, NJ, pp. 113-122 XP010662802.

Wuest H et al: "Adaptive Line Tracking with Multiple Hpotheses for Augmented Reality", Mixed and Augmented Reality, Fourth IEEE and ACM International Symposium Oct. 5, 2005, Piscataway, NJ, pp. 62-69, XP010856761.

* cited by examiner

*Primary Examiner* — Amir Alavi
*Assistant Examiner* — Kenny Cese
(74) *Attorney, Agent, or Firm* — Canon USA Inc IP Division

(57) ABSTRACT

An information processing method includes acquiring an image of an object captured by an imaging apparatus, acquiring an angle of inclination measured by an inclination sensor mounted on the object or the imaging apparatus, detecting a straight line from the captured image, and calculating a position and orientation of the object or the imaging apparatus, on which the inclination sensor is mounted, based on the angle of inclination, an equation of the detected straight line on the captured image, and an equation of a straight line in a virtual three-dimensional space that corresponds to the detected straight line.

9 Claims, 17 Drawing Sheets

FIG. 2A
FIG. 2B
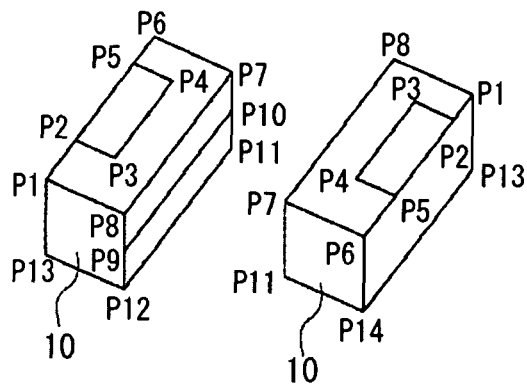
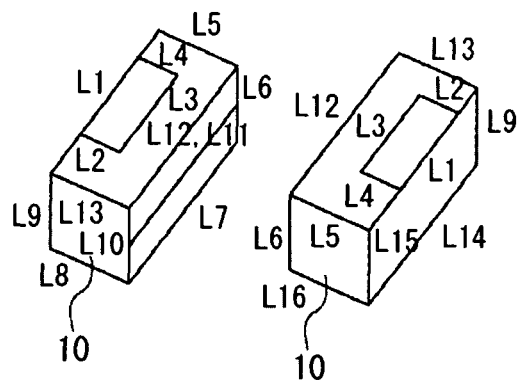
| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |
FIG. 2C
| LINE | TWO END POINTS |
|---|---|
| L1 | P1-P6 |
| L2 | P2-P3 |
| L3 | P3-P4 |
| L4 | P4-P5 |
| L5 | P6-P7 |
| L6 | P7-P11 |
| L7 | P11-P12 |
| L8 | P12-P13 |
| LL9 | P1-P13 |
| L10 | P8-P12 |
| L11 | P9-P10 |
| L12 | P7-P8 |
| L13 | P1-P8 |
| L14 | P13-P14 |
| L15 | P6-P14 |
| L16 | P11-P14 |
FIG. 2D

FIG. 9

| LINE SEGMENT | DIRECTION VECTOR |
|---|---|
| L1 | D3 |
| L2 | D1 |
| ... | ... |
| L16 | D1 |

| DIRECTION VECTOR | DIRECTION | LINE SEGMENT |
|---|---|---|
| D1 | (1, 0, 0) | L2, L4, L5, L8, L13, L16 |
| D2 | (0, 1, 0) | L6, L9, L10, L15 |
| D3 | (0, 0, 1) | L1, L3, L7, L11, L12, L14 |

FIG. 12

| 11-L1 |
|---|
| 11-L3 |
| 11-L7 |
| ⋮ |
| 11-L14 |
| 12-L2 |
| 12-L4 |
| ⋮ |
| ⋮ |
| 12-L16 |
| 13-L1 |
| 13-L3 |
| ⋮ |
| 13-L14 |

FIG. 13A   FIG. 13B   FIG. 13C   FIG. 13D
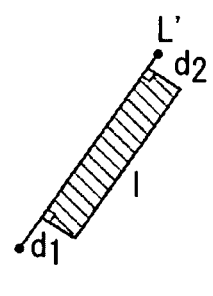 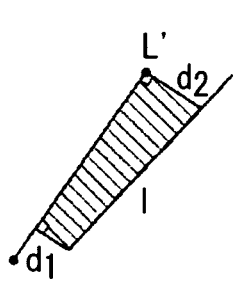 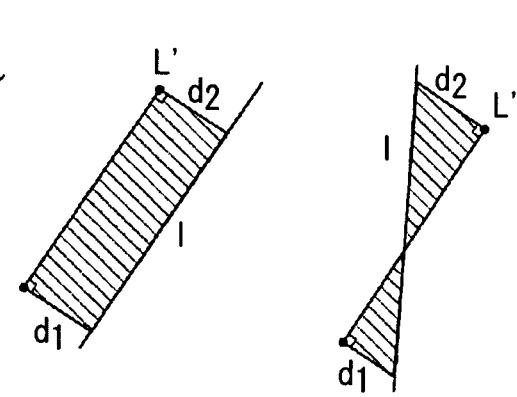

FIG. 15A
FIG. 15B
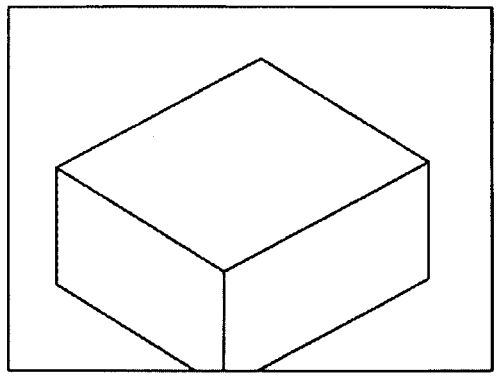
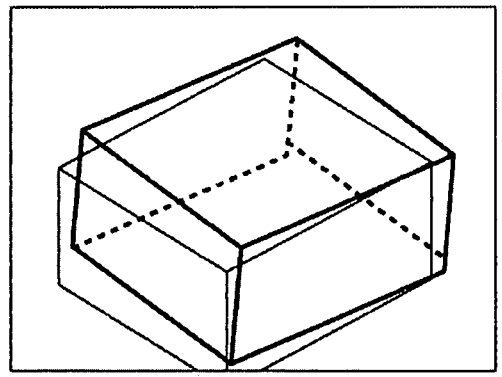

● DIVISION POINT

METHOD AND APPARATUS FOR MEASURING POSITION AND ORIENTATION OF AN OBJECT

BACKGROUND OF THE INVENTION

1. Field of the Invention

The present invention relates to a method and apparatus for measuring the position and orientation of an imaging apparatus or an object.

2. Description of the Related Art

Augmented Reality (AR) is a technology that realizes a combined display including information of a virtual space superimposed on a real space (physical space). A video see-through head-mounted display (HMD) is a representative apparatus capable of presenting AR-based information to a user. The video see-through HMD has a built-in camera that captures an image of the real space. The video see-through HMD can render an image of a virtual object based on computer graphics techniques by referring to position/orientation information of the camera in the real space. The video see-through HMD displays a composite image of a rendered virtual object superimposed on an image of the real space on its display device (e.g., a liquid crystal panel). Thus, this type of information presenting apparatus enables a user to feel as if a virtual object is actually present in the real space.

To realize AR technology successfully, "positioning" is a key technique. The "positioning" in AR technology is generally referred to as accurately maintaining the geometric consistency between a virtual object and the real space. If the "positioning" is sufficiently accurate and a user can view a virtual object constantly displayed at a correct position in the real space, a user can feel as if the virtual object is actually present in the real space.

In a system using a video see-through HMD, the "positioning" is realized by accurately measuring the position/orientation of a built-in camera in a coordinate system set in the real space. For example, a physical sensor (a magnetic sensor, an ultrasonic sensor, etc.) can be used to accurately measure the position/orientation of a camera having six degrees of freedom.

A system using a video see-through HMD can use image information from a built-in camera to measure the position/orientation of the camera. A measuring method using image information from a camera is simple and inexpensive compared to other methods using information from physical sensors.

As discussed in T. Drummond and R. Cipolla, "Real-time visual tracking of complex structures", IEEE Transactions on Pattern Analysis and Machine Intelligence, vol. 24, NO. 7, pp. 932-946, 2002 (hereinafter, referred to as "literature 1"), a three-dimensional geometric model composed of line segments representing a real space or a real object and edge information obtained from an image captured by a camera can be used to measure the position/orientation of the camera.

Any point on an image can be regarded as an "edge" if the density suddenly changes at this point. The method discussed in literature 1 includes calculating the position/orientation of a camera so that numerous edges detected on an image accord with line segments of a three-dimensional geometric model projected on the image based on the position/orientation of the camera.

More specifically, the method includes virtually projecting line segments of a three-dimensional geometric model on an image based on predicted camera position/orientation data that are input beforehand, and performing edge detection in the vicinity of the projected line segments. Furthermore, the method includes calculating the position/orientation of the camera by repetitively correcting the predicted camera position/orientation data so that detected edges are present on the projected line segments.

The above-described camera position/orientation measuring method based on edge detection uses camera position/orientation information obtained from a previous frame as predicted camera position/orientation data. Therefore, if the position/orientation measurement has failed in a frame, the position/orientation measurement in the subsequent frame cannot be performed accurately. For example, failure in the measurement may occur when the camera moves at high speed, because of generation of motion blur in the image or when edges are not present in the vicinity of the line segments projected based on predicted camera position/orientation data. Furthermore, camera position/orientation information from a previous frame is unavailable when the position/orientation measurement is performed for the first frame.

Therefore, if the measurement is performed for the first frame or performed immediately after failure, "initialization processing" for measuring the position/orientation of the camera without using predicted camera position/orientation data is required to actually use a camera position/orientation measurement based on edge detection.

To this end, a method may include setting predetermined initial position/orientation and moving a camera to the initial position/orientation beforehand, and initializing the position/orientation of the camera based on edge detection while setting the initial position/orientation information as predicted values.

There is another method for measuring the position/orientation of a camera based on features detected from an image without using predicted camera position/orientation data. The present invention is directed to a method for performing camera position/orientation measurement without using predicted camera position/orientation data. For example, as discussed in Y. Liu, T. S. Huang, and O. d. Faugeras, "Determination of camera location from 2-D to 3-D line and point correspondences", IEEE Transactions on Pattern Analysis and Machine Intelligence, vol. 12, No. 1, pp. 28-37, 1990. (hereinafter, referred to as "literature 2"), there is a method for performing camera position/orientation measurement according to correspondences between straight lines detected on an image and corresponding straight lines in a three-dimensional space.

The method discussed in literature 2 includes calculating the position/orientation of a camera by solving a linear equation set based on correspondences of at least eight straight lines. However, the method discussed in literature 2 does not mention a method for correlating straight lines detected on an image with corresponding straight lines in a three-dimensional space.

Therefore, to measure the position/orientation of a camera using the method discussed in literature 2 in a state where correspondences between straight lines on an image and straight lines in a three-dimensional space are unknown, it is necessary beforehand to obtain correspondences between straight lines detected on an image and straight lines in a three-dimensional space. In this case, a general method includes calculating the position/orientation of a camera by correlating straight lines on an image with straight lines in a three-dimensional space at random and outputting a calculation result obtained by using the correspondence having the highest consistency as a final camera position/orientation.

As discussed in Japanese Patent Application Laid-Open No. 2006-292417, to stabilize the measurement, an inclination sensor can be attached to a camera and the position/ orientation of the camera can be measured based on a measurement value obtained by the inclination sensor and image information (information of points).

As discussed in Japanese Patent Application Laid-Open No. 2004-108836, an inclination sensor can be attached to a camera and an azimuth angle of the camera can be calculated based on a measurement value obtained by the inclination sensor and straight line information obtained from an image.

According to the camera position/orientation measuring method discussed in literature 2, the position/orientation calculation may not be stably performed if a straight line is erroneously detected or due to poor image resolution. On the other hand, the method discussed in Japanese Patent Application Laid-Open No. 2006-292417 is a method capable of stabilizing the position/orientation measurement. However, this method uses correspondences between points on an image and points in a three-dimensional space and, therefore, cannot be used to detect correspondences between straight lines.

If three-dimensional coordinates of both ends of a line segment detected from an image are known beforehand, a line segment can be regarded as two points, so that the method discussed in Japanese Patent Application Laid-Open No. 2006-292417 can be used.

However, it is generally difficult to accurately detect end points of a line segment. Therefore, the method discussed in Japanese Patent Application Laid-Open No. 2006-292417 is unfeasible. On the other hand, the method discussed in Japanese Patent Application Laid-Open No. 2004-108836 calculates only the azimuth angle of a camera from one image and cannot calculate the position of the camera.

The method applicable to a case where correspondences between straight lines on an image and straight lines in a three-dimensional space are unknown includes correlating the straight lines at random, obtaining a plurality of position/orientation data, and selecting optimum position/orientation values highest in consistency. The method, however, requires a great amount of calculations so that a calculation result can surely include correct position/orientation values.

Furthermore, the method requires consistency evaluation for each of the calculated position/orientation values. The method requires a long time to obtain a final solution. If the method is used for initializing the camera position/orientation measurement based on edge detection, the initialization requires a long time and a user may be kept waiting for a long time each time the position/orientation measurement fails. Thus, usability may be significantly impaired.

SUMMARY OF THE INVENTION

Exemplary embodiments of the present invention are directed to a camera position/orientation measurement performed stably based on a captured image without using any predicted camera position/orientation data.

Furthermore, exemplary embodiments of the present invention are directed to a camera position/orientation measurement performed based on a captured image that can reduce processing time without using any predicted camera position/orientation data.

According to an aspect of the present invention, an information processing method includes acquiring an image of an object captured by an imaging apparatus, acquiring an angle of inclination measured by an inclination sensor mounted on the object or the imaging apparatus, detecting a straight line from the captured image, and calculating a position and orientation of the object or the imaging apparatus, on which the inclination sensor is mounted, based on the angle of inclination, an equation of the detected straight line on the captured image, and an equation of a straight line in a virtual three-dimensional space that corresponds to the detected straight line.

According to another aspect of the present invention, an information processing apparatus includes an image input unit configured to input an image of an object captured by an imaging apparatus, an angle-of-inclination input unit configured to input an angle of inclination measured by an inclination sensor mounted on the object or the imaging apparatus, a straight line detection unit configured to detect a straight line from the captured image, and a calculation unit configured to calculate a position and orientation of the object or the imaging apparatus, on which the inclination sensor is mounted, based on the angle of inclination, an equation of the detected straight line on the captured image, and an equation of a straight line in a virtual three-dimensional space that corresponds to the detected straight line.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIGS. 2A through 2D illustrate an example method for defining a three-dimensional geometric model.

FIG. 9 illustrates an example classification of line segment data by direction vectors.

FIG. 12 illustrates an example list of correspondence data.

FIGS. 13A though 13D illustrate example methods for calculating an evaluation value.

FIGS. 15A and 15B illustrate an example three-dimensional model projected on an image.

DETAILED DESCRIPTION OF THE EMBODIMENTS

Figure 1:
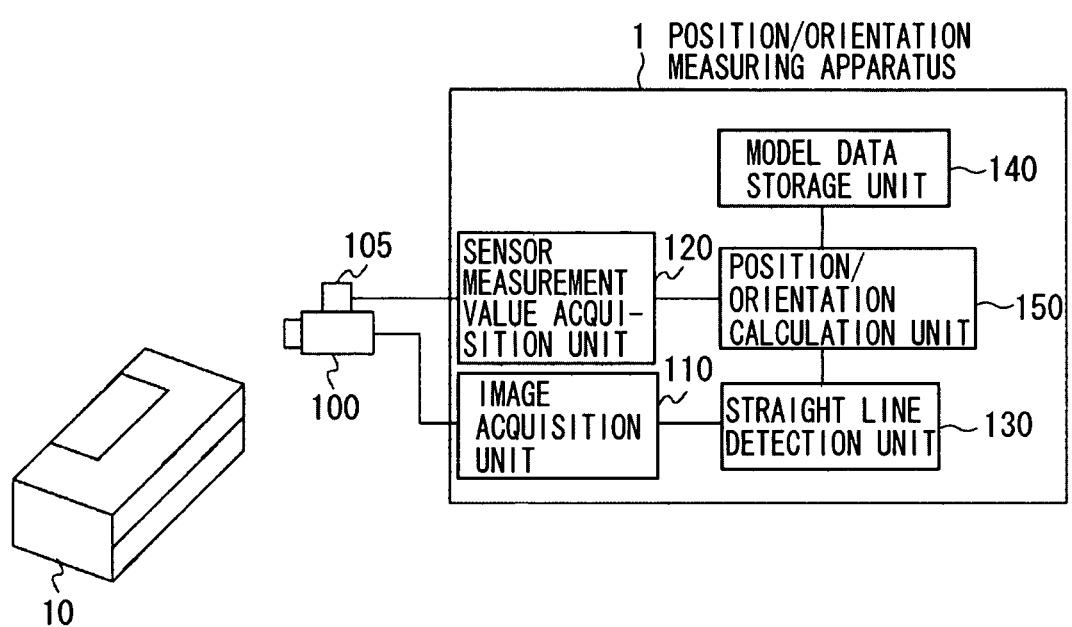
FIG. 1 illustrates a configuration of a position/orientation measuring apparatus according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it need not be discussed for following figures. Exemplary embodiments will be described in detail below with reference to the drawings.

First Exemplary Embodiment

A first exemplary embodiment of the present invention uses an inclination sensor mounted on an imaging apparatus to measure the position and orientation of the imaging apparatus.

FIG. 1 illustrates an example of the configuration of a position/orientation measuring apparatus 1 according to the first exemplary embodiment. As illustrated in FIG. 1, the position/orientation measuring apparatus 1 includes an image acquisition unit 110, a sensor measurement value acquisition unit 120, a straight line detection unit 130, a model data storage unit 140, and a position/orientation calculation unit 150.

The image acquisition unit 110 is connected to an imaging apparatus 100. The sensor measurement value acquisition unit 120 is connected to an inclination sensor 105. The imaging apparatus 100 captures an image of a viewing object 10. The position/orientation measuring apparatus 1 measures the position and orientation of the imaging apparatus 100 in a coordinate system (hereinafter, referred to as a "reference coordinate system") defined in a real three-dimensional space including the viewing object 10. The inclination sensor 105 is fixed to the imaging apparatus 100 and measures the angle of inclination of the imaging apparatus 100 relative to the reference coordinate system. The viewing object 10 is a stationary object placed in the real space.

The image acquisition unit 110 acquires an image captured by the imaging apparatus 100. The image acquisition unit 110 can be realized by an analog video capture board if the imaging apparatus 100 is an analog type imaging apparatus that outputs an NTSC signal or another analog signal, or can be realized by an IEEE1394 interface board if the imaging apparatus 100 is a digital type imaging apparatus that outputs an IEEE1394 signal or another digital signal. Furthermore, the image acquisition unit 110 can read digital data from a storage device that stores still images or moving images.

The sensor measurement value acquisition unit 120 acquires an angle of inclination from the inclination sensor 105. The sensor measurement value acquisition unit 120 can acquire an angle-of-inclination measurement value measured in synchronism with shooting timing of the image acquisition unit 110. If the image acquisition unit 110 is configured to read digital data from a storage device that stores still images or moving images, the image acquisition unit 110 can acquire an angle-of-inclination measurement value from the storage device instead of directly reading an angle-of-inclination measurement value from the inclination sensor 105.

The orientation of the inclination sensor 105 relative to the imaging apparatus 100 is accurately adjusted and fixed beforehand. Therefore, the sensor measurement value acquisition unit 120 can acquire angle-of-inclination information of the imaging apparatus 100 based on an angle-of-inclination measurement value obtained by the inclination sensor 105.

The straight line detection unit 130 detects a straight line on an image acquired by the image acquisition unit 110. An exemplary embodiment corrects and converts intrinsic parameters (focal length, distortion parameters, etc.) of the imaging apparatus 100 into appropriate values beforehand so that a detected straight line has a focal length of 1.

The model data storage unit 140 stores three-dimensional geometric model data of the viewing object 10. FIGS. 2A through 2D illustrate an example method for defining a three-dimensional geometric model according to an exemplary embodiment. A three-dimensional geometric model is composed of a set of points and a set of line segments connecting points.

An example three-dimensional geometric model of the viewing object 10 illustrated in FIG. 2A is composed of a total of fourteen points (i.e., point P1 through point P14). Point P12 represents an origin of a reference coordinate system defined in a virtual three-dimensional space. The X-axis of the reference coordinate system is set in a direction extending from point P12 (origin) to point P13. The Y-axis of the reference coordinate system is set in a direction extending from point P12 (origin) to point P8. The Z-axis of the reference coordinate system is set in a direction extending from point P12 (origin) to point P11. The Y-axis extends upward in the vertical direction (i.e., opposite direction of the gravity axis).

An example three-dimensional geometric model of the viewing object 10 illustrated in FIG. 2B is composed of a total of sixteen line segments L1 through L16. FIG. 2C illustrates a list of three-dimensional coordinate values representing respective points P1 through P14. As illustrated in FIG. 2D, line segments L1 through L16 can be expressed using ID information of points constituting respective line segments. To handle hidden line removal, the three-dimensional geometric model holds information relating to surfaces. Each surface can be expressed using ID information of points constituting each surface. The three-dimensional geometric models illustrated in FIGS. 2A through 2D store information relating to six surfaces of a cubic body.

The position/orientation calculation unit 150 calculates the position/orientation of the imaging apparatus 100 based on an angle-of-inclination measurement value acquired by the sensor measurement value acquisition unit 120, an equation of a straight line detected by the straight line detection unit 130, and an equation of a straight line in the reference coordinate system that corresponds to the detected straight line.

Figure 3:
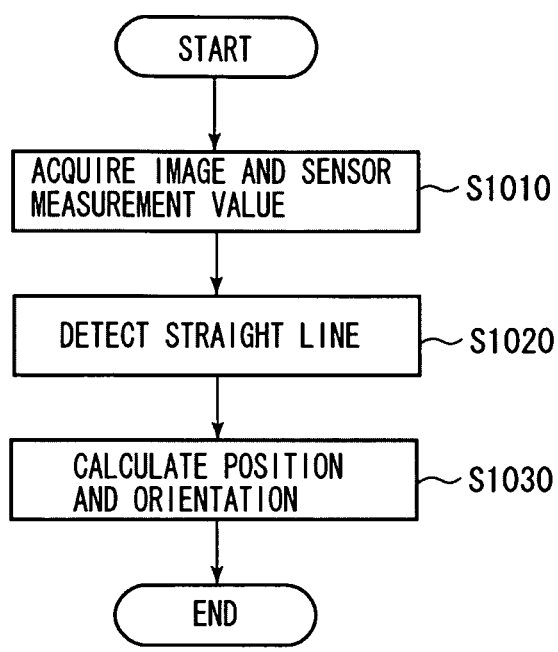
FIG. 3 is a flowchart illustrating a procedure of position/orientation measurement according to the first exemplary embodiment.

An example processing procedure of position/orientation measuring method according to the first exemplary embodiment is described below with reference to a flowchart illustrated in FIG. 3.

In step S1010, the position/orientation measuring apparatus 1 acquires an image of the viewing object 10 captured by the imaging apparatus 100 and an angle of inclination of the imaging apparatus 100 measured in synchronism with shooting timing of the imaging apparatus 100 via the image acquisition unit 110 and the sensor measurement value acquisition unit 120.

In step S1020, the straight line detection unit 130 detects straight line(s) on the image acquired in step S1010.

Figure 4:
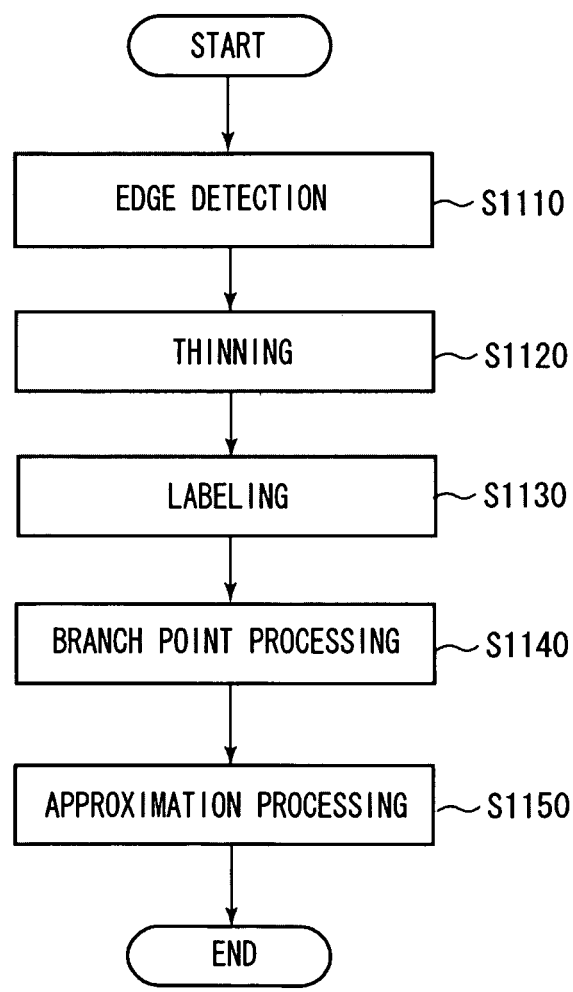
FIG. 4 is a flowchart illustrating an example processing procedure for detecting a straight line on an image.

FIG. 4 is a flowchart illustrating an example procedure of the processing performed by the straight line detection unit 130, which detects straight line(s) on an image.

In step S1110, the straight line detection unit 130 performs edge detection processing on an image. As described above, an edge represents a point on an image where the density suddenly changes. For example, the straight line detection unit 130 performs edge detection with a conventional edge detection operator (Sobel operator, Prewitt operator, etc.). More specifically, the straight line detection unit 130 applies an edge detection operator to each pixel of an image in both horizontal and vertical directions. Then, the straight line detection unit 130 calculates edge intensity and edge direction based on output values of the edge detection operator. When $f_x$ represents an output value of the edge detection operator in the horizontal direction and $f_y$ represents an output value of the edge detection operator in the vertical direction, the straight line detection unit 130 calculates edge intensity I and edge direction φ according to the following formulae:

$$I=\sqrt{(f_x^2+f_y^2)}$$

$$\phi=\arctan(f_y/f_x)$$

In step S1120, the straight line detection unit 130 performs thinning processing. An edge detected in step S1110 has a vertical width due to blur of an edge or when the edge detection operator uses a large size of a window. Hence, in step S1120, the straight line detection unit 130 performs thinning processing by comparing each pixel with a neighboring pixel located next to the target pixel in the vertical direction with respect to edge intensity, and eliminating any pixel if the pixel is not larger than the compared neighboring pixel in edge intensity to equalize the edge width to the width of one pixel. Then, the straight line detection unit 130 generates a binary image including a pixel representing an edge, to which 1 is allocated, and another pixel, to which 0 is allocated. Alternatively, the straight line detection unit 130 can perform edge detection and thinning processing using Canny edge detector, which can output edge detection result subjected to thinning processing.

In step S1130, the straight line detection unit 130 performs neighboring edge labeling processing on the binary image generated in step S1120. For example, if an edge is present somewhere in eight pixels neighboring to a target pixel, the straight line detection unit 130 allocates the same label to these pixels.

In step S1140, the straight line detection unit 130 searches a branch point (a point from which a plurality of branches separate) among neighboring edges classified into the same label in step S1130, cuts each branch from the branch point, and allocates a unique label to each branch. If there is not any branch point, the straight line detection unit 130 does not perform the branch point processing.

In step S1150, the straight line detection unit 130 performs broken line approximation processing on each branch to which a label is allocated in step S1140. For example, the straight line detection unit 130 can perform broken line approximation using the following example method. The example method includes connecting both ends of a branch with a line segment and newly providing a division point on a point of the branch where the distance to the line segment is maximized and larger than a threshold value.

Furthermore, the example method includes connecting the division point to both ends of the branch with line segments and providing a division point on a point of the branch where the distance to the line segment is largest. The straight line detection unit 130 recursively repeats the above-described processing until a broken line sufficiently approximating the branch can be obtained. Subsequently, the straight line detection unit 130 outputs coordinates of both ends of each line segment constituting the broken line as passing points of a straight line on an image.

The straight line detection according to an exemplary embodiment includes the above-described labeling processing and broken line approximation. Another exemplary embodiment may perform straight line detection using any other method capable of detecting a straight line on an image. For example, Hough transform is available for straight line detection. In step S1150, the straight line detection unit 130 can detect not only straight lines on the viewing object 10 but also any straight lines in the background.

Referring back to FIG. 3, in step S1030, the position/orientation calculation unit 150 calculates the position and orientation of the imaging apparatus 100 relative to the viewing object 10 based on the straight lines detected in step S1020. In an exemplary embodiment, the inclination sensor 105 obtains an angle-of-inclination component as a measurement value representing the orientation. Other parameters representing the orientation, such as azimuth angle component and position, are unknown variables.

In the first exemplary embodiment, it is assumed that correspondences between the straight lines detected in step S1020 and line segments of a three-dimensional geometric model stored in the model data storage unit 140 can be manually determined beforehand. Instead of performing the above-described manual setting, an exemplary embodiment may record peripheral image information of a line segment in the real space beforehand and perform pattern matching between the recorded peripheral image information and peripheral image information of a line segment detected on an image to determine correspondences.

An exemplary embodiment defines a coordinate system of the imaging apparatus 100 (hereinafter, referred to as a "camera coordinate system") in the following manner. The camera coordinate system has an origin located on a viewpoint C (FIG. 5), the z-axis extending in the opposite direction of a visual axis vector, the x-axis extending in the horizontal direction of an image plane, and the y-axis extending in the vertical direction. The imaging apparatus 100 has a focal length of 1. The image plane is located at z=−1 in the camera coordinate system. An image coordinate system has an origin located on an intersection of the image plane and the z-axis of the camera coordinate system (i.e., visual axis vector). The image coordinate system can be used to express information relating to the straight lines detected in step S1020.

The following formula (1) defines conversion from an arbitrary three-dimensional vector $x_w$ in the reference coordinate system into a three-dimensional vector $x_c$ in the camera coordinate system.

$$x_c=R_{cw}x_w+t_{cw} \quad (1)$$

In formula (1), $R_{cw}$ is a 3×3 rotation matrix that represents the orientation of the reference coordinate system relative to the camera coordinate system. A relationship defined by $R_{cw}=R_{wc}^{-1}$ is satisfied when a 3×3 rotation matrix $R_{wc}$ represents the orientation of the camera coordinate system (i.e., the imaging apparatus 100) in the reference coordinate system. Furthermore, in formula (1), $t_{cw}$ is a three-dimensional vector that represents the position of the origin of the reference coordinate system relative to the camera coordinate system. A relationship defined by $t_{wc}=−R_{wc}t_{cw}$ is satisfied when a three-dimensional vector $t_{wc}$ represents the position of the camera coordinate system (i.e., the imaging apparatus 100) in the reference coordinate system.

Figure 5:
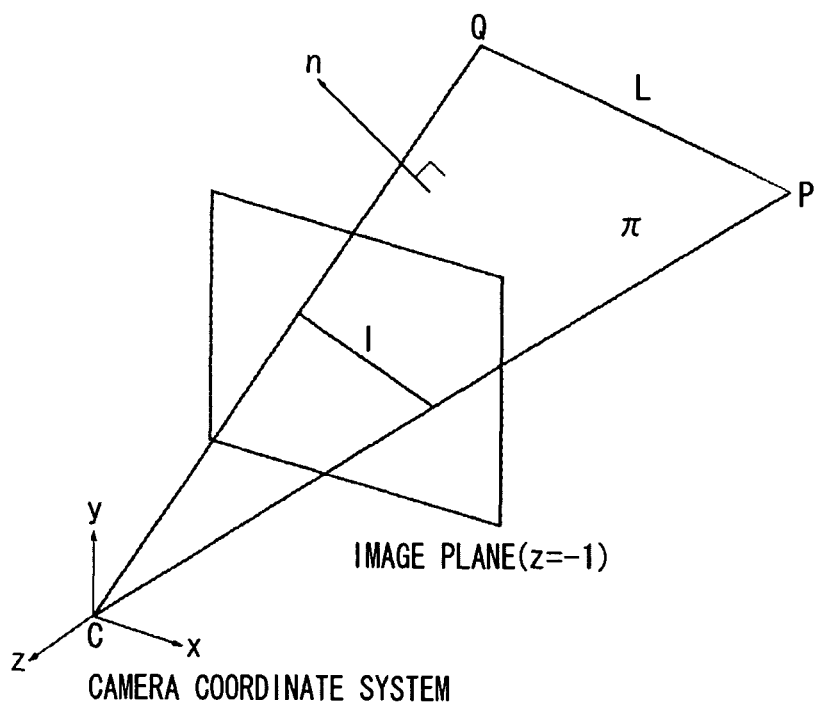
FIG. 5 illustrates an example relationship between a straight line on an image and a straight line in a three-dimensional space.

FIG. 5 illustrates an example relationship between a straight line on an image and a straight line in a three-dimensional space. In general, when an image of a straight line in the three-dimensional space is captured by an imaging apparatus, an image projected on the image plane is a straight line. As illustrated in FIG. 5, straight line L connecting points P and Q in the three-dimensional space is projected on the image plane as straight line l. The straight line l is a crossing line along which the image plane intersects a plane π including straight line L and viewpoint C. A normal vector n on the plane π is perpendicular to vectors CP, CQ, and PQ. When three-dimensional vectors p and q represent the positions of points P and Q in the reference coordinate system and a vector d (=q−p) is a direction vector of the straight line L in the reference coordinate system, an orthogonal condition among these vectors satisfies the following formulae (2) through (4):

$$n \cdot (R_{cw} p + t_{cw}) = 0 \quad (2)$$

$$n \cdot (R_{cw} q + t_{cw}) = 0 \quad (3)$$

$$n \cdot R_{cw} d = 0 \quad (4)$$

In formulae (2) through (4), symbol "·" represents an inner product of vectors.

When a 3×3 rotation matrix $R_{wc}{}^i$ represents an angle-of-inclination component and a 3×3 rotation matrix $R_{wc}{}^a$ represents an azimuth angle component as information expressing the orientation of the imaging apparatus 100, the following formula defines the 3×3 rotation matrix $R_{wc}$ that represents the orientation.

$$R_{wc} = R_{wc}{}^a R_{wc}{}^i$$

Therefore, the following formula expresses the 3×3 rotation matrix $R_{cw}$.

$$R_{cw} = R_{wc}{}^{-1} = (R_{wc}{}^i)^{-1} (R_{wc}{}^a)^{-1}$$

The angle of inclination represents an inclination of the axis of gravity relative to the coordinate system of a measurement object (the camera coordinate system in an exemplary embodiment). The angle of inclination has two degrees of freedom. The azimuth angle represents a rotational angle of the measurement object around the axis of gravity. The azimuth angle has one degree of freedom.

The following formula (5) defines $(R_{wc}{}^i)^{-1}$.

$$(R_{wc}^i)^{-1} = [r_1 \ r_2 \ r_3] = \begin{bmatrix} r_{11} & r_{12} & r_{13} \\ r_{21} & r_{22} & r_{23} \\ r_{31} & r_{32} & r_{33} \end{bmatrix} \quad (5)$$

In formula (5), vectors $r_1$, $r_2$, and $r_3$ represent respective columns in the matrix $(R_{wc}{}^i)^{-1}$.

The value of each element in $(R_{wc}{}^i)^{-1}$ can be determined according to a measurement value obtained by the inclination sensor 105. As described above in the description of the sensor measurement value acquisition unit 120, the orientation of the inclination sensor 105 relative to the imaging apparatus 100 is accurately adjusted and fixed beforehand. Therefore, the angle of inclination of the imaging apparatus 100 can be calculated based on a measurement value obtained by the inclination sensor 105.

As described above in the description of the model data storage unit 140, the y-axis of the reference coordinate system is a vector extending upward in the vertical direction. The following formula (6) defines the rotation matrix $R_{wc}{}^a$ representing the azimuth angle, when the azimuth angle is θ, α=cos θ, and β=sin θ.

$$R_{wc}^a = \begin{bmatrix} \alpha & 0 & \beta \\ 0 & 1 & 0 \\ -\beta & 0 & \alpha \end{bmatrix} \quad (6)$$

When $n=[n_x n_y n_z]^t$, $p=[p_x p_y p_z]^t$, $q=[q_x q_y q_z]^t$, and $t_{cw}=[t_x t_y t_z]^t$, the following formula (7) and formula (8) can be derived by inputting formula (5) and formula (6) into formula (2) and formula (3).

$$(n^t r_1 p_x + n^t r_3 p_z)\alpha + (n^t r_3 p_x - n^t r_1 p_z)\beta + n_x t_x + n_y t_y + n_z t_z = -n^t r_2 p_y \quad (7)$$

$$(n^t r_1 q_x + n^t r_3 q_z)\alpha + (n^t r_3 q_x - n^t r_1 q_z)\beta + n_x t_x + n_y t_y + n_z t_z = -n^t r_2 q_y \quad (8)$$

Formula (7) and formula (8) are linear equations including unknown variables α, β, $t_x$, $t_y$, and $t_z$. When coordinate values $(x_1, y_1)$ and $(x_2, y_2)$ represent two passing points of a straight line detected on an image in the coordinate system of an image plane having the focal length=1, $x_{c1} = [x_1 y_1 -1]^t$ and $x_{c2} = [x_2 y_2 -1]^t$ represent two passing points in the camera coordinate system. The normal vector n is a vector perpendicular to both of $x_{c1}$ and $x_{c2}$ and can be expressed by $n = x_{c1} \times x_{c2}$ (× represents an outer product). Thus, a straight line detected on an image can be correlated with a straight line in a three-dimensional space using an equation including the normal vector n.

An exemplary embodiment calculates α, β, $t_x$, $t_y$, and $t_z$ by solving simultaneous equations including α, β, $t_x$, $t_y$, and $t_z$ defined by formula (7) and formula (8), which represent established correspondences between a plurality of straight lines on an image and straight lines in the three-dimensional space. In the following description, a vector $s=[\alpha \beta t_x t_y t_z]^t$ represents unknown parameters α, β, $t_x$, $t_y$ and $t_z$. Coordinate values of both ends of each line segment in a three-dimensional geometric model are used for vectors p and q.

(i) In a case where at least one straight line is not present on the same horizontal plane:

If at least one of straight lines used in the position/orientation calculation is not present on the same horizontal plane in a three-dimensional space, an exemplary embodiment calculates "s" by solving simultaneous equations expressed in the form of As=b (A is a matrix composed of coefficients constituting the left sides of formula (7) and formula (8) and b is a vector composed of values in the right sides of formula (7) and formula (8)). In general, the number of lines of the matrix A is larger than the number of unknown variables (i.e., the number of elements of "s"). Therefore, an exemplary embodiment calculates "s" using a least square method expressed by the following formula (9).

$$s = (A^t A)^{-1} A^t b \quad (9)$$

Assuming that $s' = [s^t 1]^t$ and $A' = [A - b]$, an exemplary embodiment calculates "s" by obtaining an eigenvector corresponding to minimum eigenvalues of the matrix $(A')^t A'$ and dividing respective elements of s' so that the final element becomes 1.

An exemplary embodiment calculates the azimuth angle θ and the position $t_{wc}$ of the imaging apparatus 100 based on the obtained "s." An exemplary embodiment calculates the azimuth angle θ based on the signs of α and β and a value of $\tan^{-1}(\beta/\alpha)$. An exemplary embodiment calculates the rotation matrix $R_{wc}$ representing the orientation of the imaging apparatus 100 considering the relationship defined by $R_{wc} = R_{wc}^a R_{wc}^i$ based on the calculated azimuth angle and the angle-of-inclination measurement value. The position $t_{wc}$ of the imaging apparatus 100 can be calculated according to the following formula (10):

$$t_{wc} = -R_{wc} t_{cw} \tag{10}$$

In the case of (i), the unknown variable "s" has five degrees of freedom. As two equations of formula (7) and formula (8) can be set from a correspondence of one straight line, correspondences of at least three straight lines are additionally required. However, the condition to be satisfied in this case is that not all of the straight lines intersect at the same point and not all of the straight lines are parallel to each other in a three-dimensional space.

(ii) In a case where all of the straight lines are on the same horizontal plane:

If all of the straight lines used in the position/orientation calculation are present on the same horizontal plane ($y = y_1$) in a three-dimensional space, $p_y = y_1$ and $q_y = y_1$. Therefore, the following formula (11) and formula (12) can be derived by setting $P_y = 0$ and $q_y = 0$ and equalizing the right sides of formula (7) and formula (8) to 0.

$$(n^t r_1 p_x + n^t r_3 p_z)\alpha + (n^t r_3 p_x - n^t r_1 p_z)\beta + n_x t_x + n_y t_y + n_z t_z = 0 \tag{11}$$

$$(n^t r_1 q_x + n^t r_3 q_z)\alpha + (n^t r_3 q_x - n^t r_1 q_z)\beta + n_x t_x + n_y t_y + n_z t_z = 0 \tag{12}$$

As simultaneous equations can be set in the form of As=0, an exemplary embodiment calculates "s" as an eigenvector corresponding to minimum eigenvalues of the matrix $A^t A$. In this case, a scale factor including the sign of "s" is undetermined. Hence, an exemplary embodiment determines the scale so that a relationship $\alpha^2 + \beta^2 = 1$ (i.e., $\cos^2\theta + \sin^2\theta = 1$) can be satisfied.

An exemplary embodiment uses the following method to select the sign of "s" between two "s" candidates having different signs ($s_1 = [\alpha_0 \beta_0 t_{x0} t_{y0} t_{z0}]^t$ and $s_2 = [-\alpha_0 -\beta_0 -t_{x0} -t_{y0} -t_{z0}]^t$). First, an exemplary embodiment calculates the position and orientation of the imaging apparatus 100 for each of $s_1$ and $s_2$ and then calculates the azimuth angle $\theta$ based on the signs of $\alpha$ and $\beta$ and a value of $\tan^{-1}(\beta/\alpha)$. Then, the exemplary embodiment calculates the rotation matrix $R_{wc}$ representing the orientation of the imaging apparatus 100 considering the relationship defined by $R_{wc} = R_{wc}^a R_{wc}^i$ based on the calculated azimuth angle and the angle-of-inclination measurement value. The position $t_{wc}$ can be calculated according to the following formula (13):

$$t_{wc} = -R_{wc} t_{cs} + \begin{bmatrix} 0 \\ y_1 \\ 0 \end{bmatrix} \tag{13}$$

Next, the exemplary embodiment obtains the position of passing points $(x_1, y_1)$ and $(x_2, y_2)$ of a straight line on an image plane in the camera coordinate system for each of the position and orientation, and selects "s" having a negative z value as a solution.

In the case of (ii), the unknown variable "s" has four degrees of freedom. As two equations of formula (11) and formula (12) can be set from one straight line, correspondences of two straight lines are additionally required to obtain unknown variables having four degrees of freedom. However, two straight lines on the same horizontal plane are parallel to each other or intersect with each other. In such a case, the unknown variables cannot be identified. Therefore, if all of the straight lines are present on the same horizontal plane, the condition to be satisfied is that at least one straight line is not parallel to other straight lines and not all of the straight lines intersect at a point. Therefore, correspondences of at least three straight lines are required.

As described above, the first exemplary embodiment directly calculates the position and orientation of an imaging apparatus based on an angle-of-inclination measurement value measured by an inclination sensor mounted on the imaging apparatus, a straight lines detected on an image, and a straight line in a three-dimensional geometric model corresponding to the detected straight line.

The usage of an inclination sensor can reduce the number of degrees of freedom of unknown variables from 6 to 4. Therefore, an exemplary embodiment can calculate the position and orientation of an imaging apparatus with a smaller number of correspondences between straight lines. Furthermore, even when there are numerous correspondences, an exemplary embodiment can stably obtain a solution compared to a method using image information only.

Modified Embodiment 1-1

The first exemplary embodiment independently obtains $\alpha$ and $\beta$ that are not inherently independent from each other when not all of the straight lines are present on the same horizontal plane (in the case of (i)). Therefore, $\alpha$ and $\beta$ may not satisfy the constraint condition of $\alpha^2 + \alpha^2 = 1$ (i.e., $\cos^2\theta + \sin^2\theta = 1$).

Hence, an exemplary embodiment performs nonlinear optimization on unknown variables $\theta$, $t_x$, $t_y$, and $t_z$ calculated using the method described in the first exemplary embodiment to correct $\theta$, $t_x$, $t_y$, and $t_z$. When $\theta_0$, $t_{x0}$, $t_{y0}$, and $t_{z0}$ are unknown variables calculated using the method described in the first exemplary embodiment, the following formula (14) and formula (15) can be derived by performing primary approximation on formula (7) and formula (8) in the vicinity of the calculated unknown variables.

$$\{(n^t r_3 p_x - n^t r_1 p_z)\cos\theta_0 - (n^t r_1 p_x + n^t r_3 p_s)\sin\theta_0\}\Delta\theta + n_x\Delta t_x + n_y\Delta t_y + n_z\Delta y_z = e_p \tag{14}$$

$$\{(n^t r_3 q_x - n^t r_1 q_s)\cos\theta_0 - (n^t r_1 q_x + n^t r_3 q_z)\sin\theta_0\}\Delta\theta + n_x\Delta t_x + n_y\Delta t_y + n_z\Delta t_s = e_q \tag{15}$$

In formulae (14) and (15), $$e_p = -n^t r_2 p_y - \{(n^t r_1 p_x + n^t r_3 p_z)\cos\theta_0 + (n^t r_3 p_x - n^t r_1 p_z)\sin\theta_0 + n_x t_{x0} + n_y t_{y0} + n_z t_{z0}\}$$

$$e_q = -n^t r_2 q_y - \{(n^t r_1 q_x + n^t r_3 q_s)\cos\theta_0 + (n^t r_3 q_x - n^t r_1 q_s)\sin\theta_0 + n_x t_{x0} + n_y t_{y0} + n_z y_{z0}\}$$

and, $\Delta\theta$, $\Delta t_x$, $\Delta t_y$, and $\Delta t_z$ represent minute change amounts of $\theta$, $t_x$, $t_y$, and $t_z$.

An exemplary embodiment performs correction on $\theta_0$, $t_{x0}$, $t_{y0}$, and $t_{z0}$ using correction values $\Delta\theta$, $\Delta t_x$, $\Delta t_y$, and $\Delta t_z$ that can be obtained by solving linear simultaneous equations set for $\Delta\theta$, $\Delta t_x$, $\Delta t_y$, and $\Delta t_z$ using formula (14) and formula (15). An exemplary embodiment can perform the above-described processing only one time, or can repeat the processing using correction values that can be obtained by solving simultaneous equations set for corrected results using formula (14) and formula (15).

Modified Embodiment 1-2

The first exemplary embodiment simultaneously calculates the position and the azimuth angle of an imaging apparatus using constraint conditions defined by formula (2) and formula (3). However, the position and the azimuth angle can be separately calculated. An exemplary embodiment calculates the position using the constraint conditions defined by formula (2) or formula (3) after calculating the azimuth angle using the constraint condition defined by formula (4). When $d=[d_x d_y d_z]^t$, the following formula (16) can be derived by substituting formula (5) and formula (6) into formula (2) and formula (3).

$$(n^t r_1 d_x + n^t r_3 d_z)\alpha + (n^t r_3 d_x - n^t r_1 d_z)\beta = -n^t r_3 d_y \quad (16)$$

An exemplary embodiment can calculate α and β by solving simultaneous equations including α and β defined by formula (16), which represents established correspondences between a plurality of straight lines on an image and straight lines in a three-dimensional space. If the direction of a straight line is parallel to a vertical vector, $d_x=d_z=0$. Therefore, such a straight line cannot be used because all of the coefficients in the left side become 0. An exemplary embodiment can use a method for calculating the azimuth angle θ based on α and β, which is similar to the method described in the first exemplary embodiment. If the direction of each straight line is horizontal, $d_y=0$ and the right side of formula (16) becomes 0. In this case, the unknown variable has only one degree of freedom. Therefore, an exemplary embodiment can calculate α and β based on at least one straight line.

If the direction of at least one straight line is not horizontal, the unknown variable has two degrees of freedom. Therefore, an exemplary embodiment can calculate α and β using at least two straight lines. If the right side of formula (16) is 0, the signs of α and β cannot be determined. In such a case, an exemplary embodiment obtains two azimuth angles from two types of α and β having different signs, performs position calculation for each azimuth angle, and selects one of the azimuth angles according to a method similar to the method described in the first exemplary embodiment.

An exemplary embodiment calculates the rotation matrix $R_{wc}$ representing the orientation of the imaging apparatus 100 considering the relationship defined by $R_{wc}=R_{wc}{}^a R_{wc}{}^i$ based on the calculated azimuth angle and the angle-of-inclination measurement value. When $p'=R_{cw}p$ and $q'=R_{cw}q$, the following formula (17) and formula (18) can be derived from formula (2) and formula (3). From the relationship defined by formula (4), formula (17) and formula (18) represent the same equation.

$$n_x t_x + n_y t_y + n_z t_z = -n^t p' \quad (17)$$

$$n_x t_x + n_y t_y + n_z t_z = -n^t q' \quad (18)$$

An exemplary embodiment can calculate $t_x$, $t_y$, and $t_z$ by solving simultaneous equations defined by formula (17) or formula (18), which represents established correspondences between a plurality of straight lines on an image and straight lines in a three-dimensional space. At least three straight lines that do not intersect at one point and are not parallel to each other are required to obtain a solution.

An exemplary embodiment may perform correction according to the method described in the modified embodiment 1-1 after calculating the position and azimuth angle of an imaging apparatus according to the method of the modified embodiment 1-2.

Second Exemplary Embodiment

The position/orientation calculation method described in the first exemplary embodiment is usable when correspondences between straight lines detected on an image and line segments in a three-dimensional geometric model are known beforehand. A second exemplary embodiment describes a position/orientation calculation method using a measurement value obtained by an inclination sensor when correspondences between straight lines detected on an image and line segments in a three-dimensional geometric model are unknown.

Figure 6:
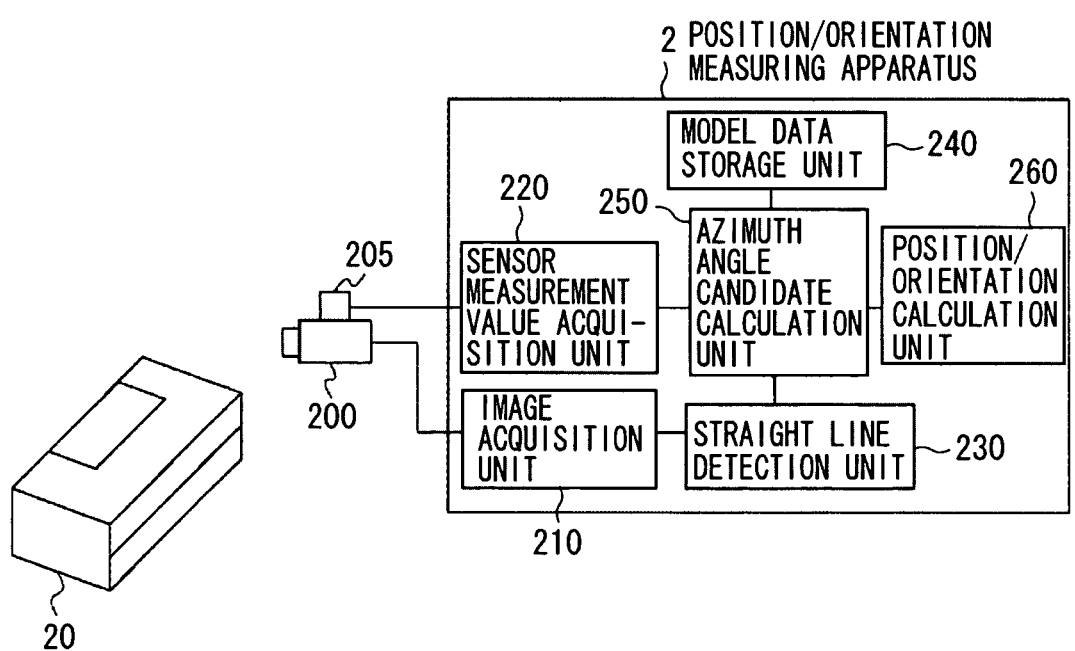
FIG. 6 illustrates a configuration of a position/orientation measuring apparatus according to a second exemplary embodiment of the present invention.

FIG. 6 illustrates an example of a configuration of a position/orientation measuring apparatus 2 according to the second exemplary embodiment. As illustrated in FIG. 6, the position/orientation measuring apparatus 2 includes an image acquisition unit 210, a sensor measurement value acquisition unit 220, a straight line detection unit 230, a model data storage unit 240, an azimuth angle candidate calculation unit 250, and a position/orientation calculation unit 260. The image acquisition unit 210 is connected to an imaging apparatus 200. The sensor measurement value acquisition unit 220 is connected to an inclination sensor 205. Similar to the first exemplary embodiment, the imaging apparatus 200 captures an image of a viewing object 20. The position/orientation measuring apparatus 2 measures the position and orientation of the imaging apparatus 200 in a reference coordinate system defined in a real three-dimensional space that includes the viewing object 20. The inclination sensor 205 is fixed to the imaging apparatus 200.

The image acquisition unit 210, the sensor measurement value acquisition unit 220, the straight line detection unit 230, and the model data storage unit 240 are functionally equivalent to the image acquisition unit 110, the sensor measurement value acquisition unit 120, the straight line detection unit 130, and the model data storage unit 140 described in the first exemplary embodiment. The azimuth angle candidate calculation unit 250 calculates an azimuth angle candidate value of the imaging apparatus 200 based on an angle-of-inclination measurement value acquired by the sensor measurement value acquisition unit 220 and an equation of a straight line detected by the straight line detection unit 230.

The position/orientation calculation unit 260 calculates the position and orientation of the imaging apparatus 200 based on an angle-of-inclination measurement value acquired by the sensor measurement value acquisition unit 220, an equation of a straight line detected by the straight line detection unit 230, and an azimuth angle candidate value calculated by the azimuth angle candidate calculation unit 250. The model data storage unit 240 according to the second exemplary embodiment can classify line segment model data by referring to their direction vectors and stores the classified data as part of model data.

FIG. 9 illustrates an example classification of line segment model data according to the type of direction vector. When direction vectors D1, D2, and D3 are defined by (1,0,0), (0,1,0), and (0,0,1), line segments L1 through L16 constituting an object illustrated in FIG. 2 can be classified into three groups according to the type of direction vector. For example, the number of direction vectors can be determined by counting the number of different vectors when an angle between vectors is equal to or greater than a predetermined angle. Each of the line segments L1 through L16 can be classified into one of the classes corresponding to the direction vectors D1, D2, and D3 as illustrated in FIG. 9.

Figure 7:
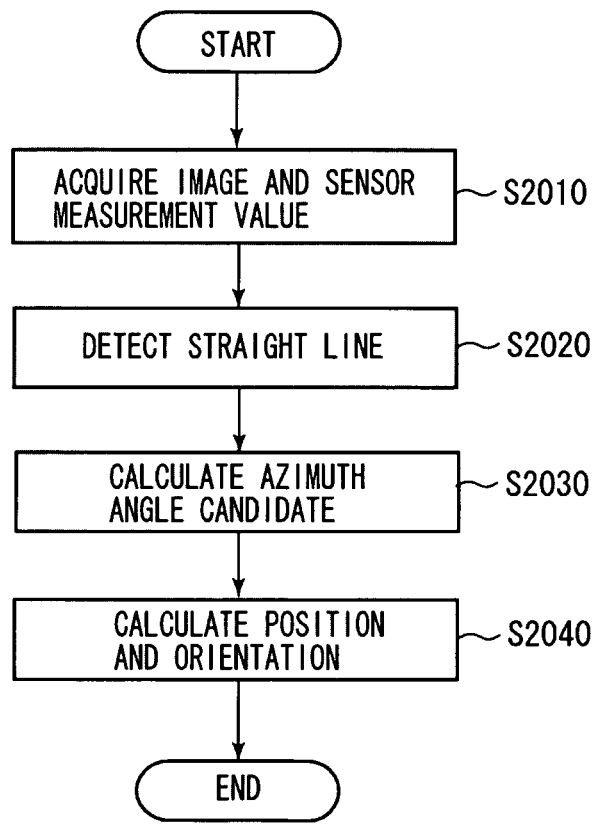
FIG. 7 is a flowchart illustrating a procedure of position/orientation measurement according to the second exemplary embodiment.

A position/orientation measuring method according to the second exemplary embodiment is described below with reference to the flowchart illustrated in FIG. 7.

In step S2010, the position/orientation measuring apparatus 2 acquires an image of the viewing object 20 captured by the imaging apparatus 200 and an angle of inclination of the imaging apparatus 200 measured in synchronism with shooting timing of the imaging apparatus 200 via the image acquisition unit 210 and the sensor measurement value acquisition unit 220.

In step S2020, the straight line detection unit 230 detects straight line(s) on the image acquired in step S2010 according to a method similar to the straight line detection method described in the first exemplary embodiment. In an exemplary embodiment, features (information of end points) of line segments of the detected straight lines can be used in later-described processing performed in step S2245. Therefore, when Hough transform or another method capable of directly detecting straight line(s) is used, an exemplary embodiment extracts line segments representing a continuous region from detected straight lines and registers end points of the extracted lines as passing points of straight lines.

In step S2030, the azimuth angle candidate calculation unit 250 calculates an azimuth angle candidate value of the imaging apparatus 200 in the reference coordinate system using the angle-of-inclination measurement value and the straight lines detected in step S2020.

In the second exemplary embodiment, correspondences between straight lines detected on an image and line segments in a three-dimensional geometric model are unknown. Therefore, the second exemplary embodiment cannot directly calculate the position and orientation using the method described in the first exemplary embodiment. Hence, the second exemplary embodiment calculates an azimuth angle on the assumption that a detected straight line corresponds to a line segment in a three-dimensional geometric model.

The second exemplary embodiment performs the processing for all of the line segments in a three-dimensional geometric model and performs voting for a calculated azimuth angle. Furthermore, the second exemplary embodiment performs the processing for all of the detected straight lines and obtains an azimuth angle having the highest likelihood based on the result of voting.

When a detected straight line is correlated with a line segment having the same direction vector, the same azimuth angle can be obtained. Hence, an exemplary embodiment calculates an azimuth angle for each detected straight line while correlating the detected straight line with a direction vector classified in the three-dimensional geometric model and votes for the calculated azimuth angle to output an azimuth angle having the largest number in voting as an azimuth angle candidate value.

Figure 8:
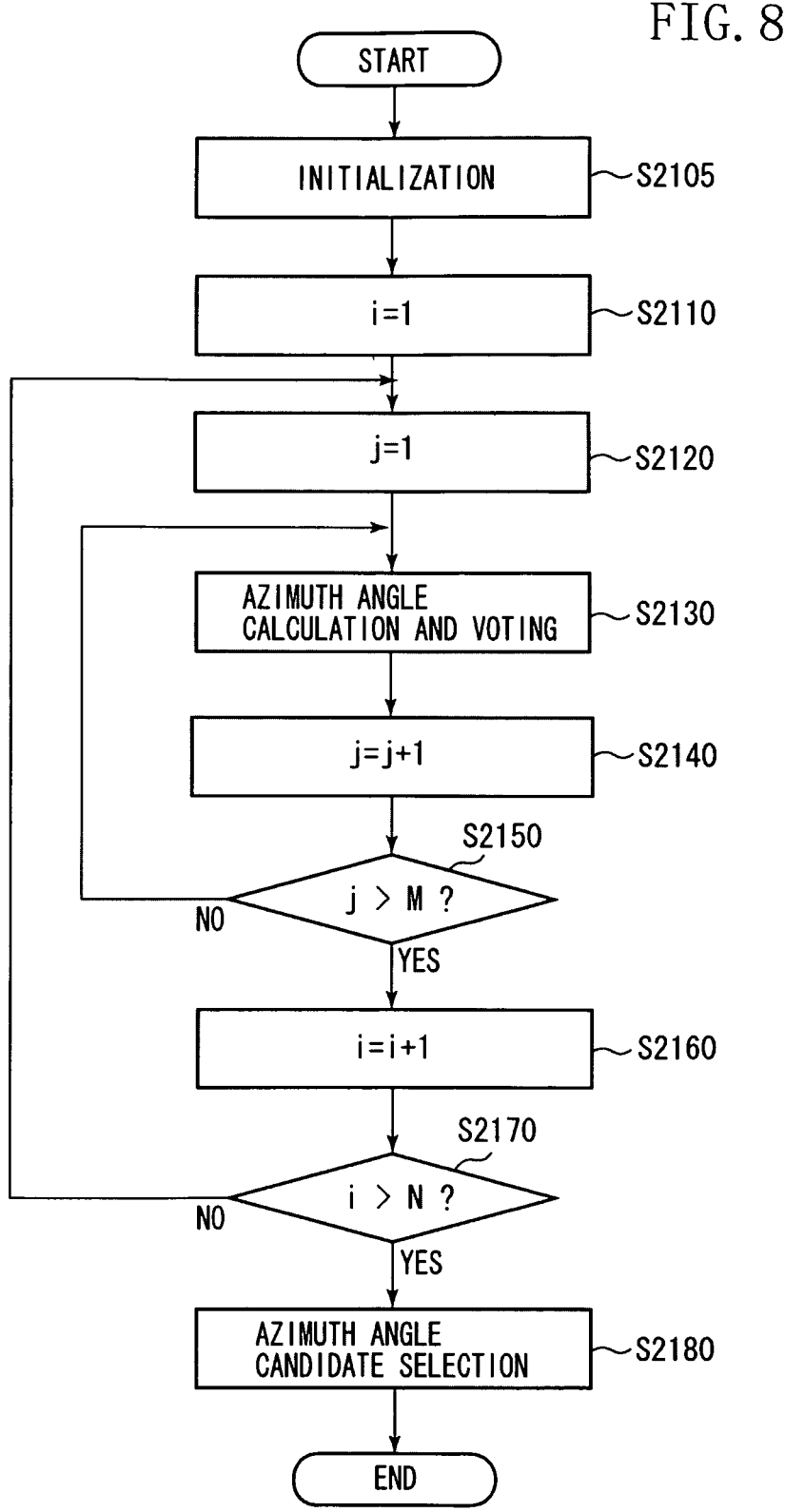
FIG. 8 is a flowchart illustrating an example processing method for calculating an azimuth angle candidate value.

FIG. 8 is a flowchart illustrating an example processing method for azimuth angle candidate value calculation. In FIG. 8, "i ($1 \leq i \leq N$)" represents a straight line presently processed, and "j ($1 \leq j \leq M$)" represents a direction vector presently processed. Furthermore, N represents the number of straight lines detected in step S2020, and M represents the number of direction vectors of line segments in a three-dimensional geometric model.

In step S2105, the azimuth angle candidate calculation unit 250 initializes a histogram of azimuth angle. The azimuth angle candidate calculation unit 250 quantizes the range of azimuth angle in increments of a predetermined step (e.g., 1 degree) and sets the frequency of each class in the histogram to 0. However, the quantization step is not limited to 1 degree.

Next, in step S2110, the azimuth angle candidate calculation unit 250 sets "i" to 1. In step S2120, the azimuth angle candidate calculation unit 250 sets "j" to 1. In step S2130, the azimuth angle candidate calculation unit 250 performs azimuth angle calculation and voting. The azimuth angle candidate calculation unit 250 performs azimuth angle calculation according to formula (16) by referring to the correspondence of straight line "i" and direction vector "j" on an image. For simplifying the description, formula (16) can be replaced with the following formula (19):

$$a\alpha + b\beta + c = 0 \qquad (19)$$

Figure 10:
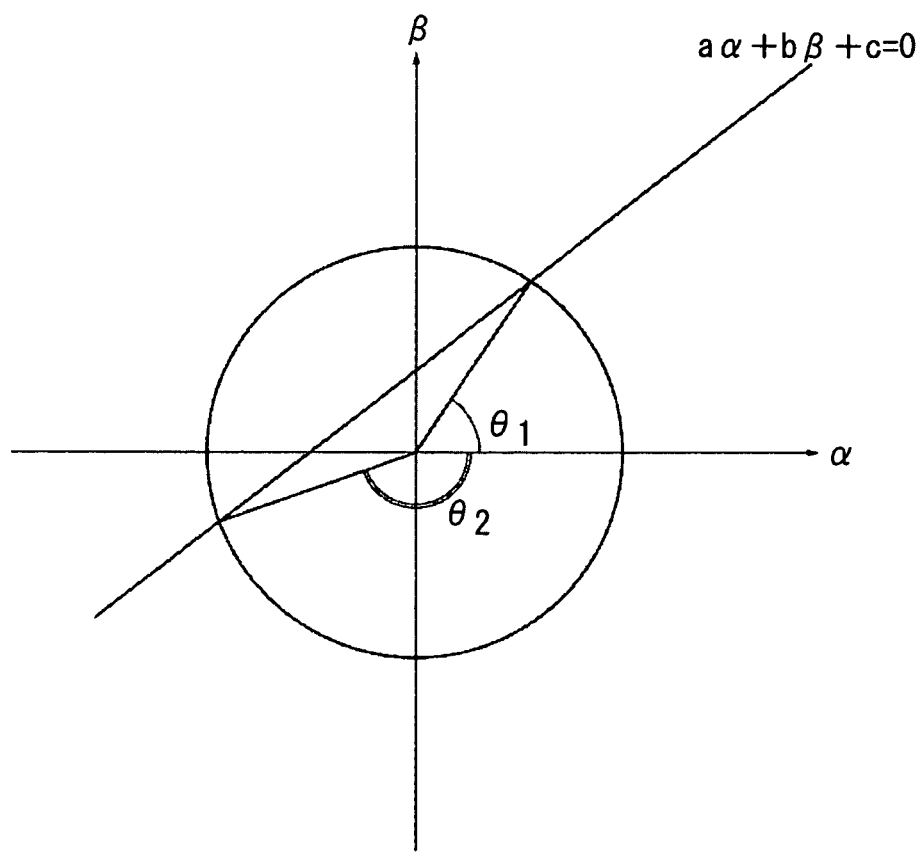
FIG. 10 illustrates an example method for calculating an azimuth angle.

Formula (19) can be regarded as an equation of a straight line on the $\alpha$–$\beta$ plane. Furthermore, from the relationship defined by $\alpha^2 + \beta^2 = 1$ (i.e., $\cos^2\theta + \sin^2\theta = 1$), as illustrated in FIG. 10, the azimuth angle candidate calculation unit 250 can obtain $\alpha$ and $\beta$ as intersections of the circle $\alpha^2 + \beta^2 = 1$ and the straight line $a\alpha + b\beta + c = 0$ and obtain azimuth angles $\theta_1$ and $\theta_2$. If the straight line $a\alpha + b\beta + c = 0$ is tangential to the circle $\alpha^2 + \beta^2 = 1$, the azimuth angle candidate calculation unit 250 can obtain only one azimuth angle. When the circle $\alpha^2 + \beta^2 = 1$ does not intersect with the straight line $a\alpha + b\beta + c = 0$, the azimuth angle candidate calculation unit 250 cannot obtain any azimuth angle. Furthermore, when the direction vector is a vector extending in the vertical direction, $a=b=0$, so that the azimuth angle candidate calculation unit 250 cannot obtain any azimuth angle.

The azimuth angle candidate calculation unit 250 increments the frequency of a corresponding class in the azimuth angle histogram that has a representative value closest to the obtained azimuth angles $\theta_1$ and $\theta_2$. In this case, for each class being voted, the azimuth angle candidate calculation unit 250 stores a combination of a straight line on an image and a direction vector used in the azimuth angle calculation.

In step S2140, the azimuth angle candidate calculation unit 250 increments "j" by 1. In step S2150, the azimuth angle candidate calculation unit 250 determines whether the processing has been completed for all of the direction vectors. If the azimuth angle candidate calculation unit 250 determines that the processing in step S2130 has been completed for all of the direction vectors (YES in step S2150), the processing proceeds to step S2160. If the azimuth angle candidate calculation unit 250 determines that the processing in step S2130 is not completed for all of the direction vectors (NO in step S2150), the azimuth angle candidate calculation unit 250 performs azimuth angle calculation and voting for a new combination in step S2130.

In step S2160, the azimuth angle candidate calculation unit 250 increments "i" by 1. In step S2170, the azimuth angle candidate calculation unit 250 determines whether the processing has been completed for all of the straight lines on the image. If the azimuth angle candidate calculation unit 250 determines that the processing has been completed for all of the straight lines on the image (YES in step S2170), the processing proceeds to step S2180. If the azimuth angle candidate calculation unit 250 determines that the processing is not completed for all of the straight lines on the image (NO in step S2170), the azimuth angle candidate calculation unit 250 performs processing for the next straight line in step S2120.

After the azimuth angle candidate calculation unit 250 completes the calculation of azimuth angle for all of the combinations of straight lines on an image and direction vectors and the voting to the histogram, the processing proceeds to step S2180. In step S2180, the azimuth angle candidate calculation unit 250 selects an azimuth angle candidate value. In an exemplary embodiment, the azimuth angle candidate value is a representative value of a class having the largest frequency in the azimuth angle histogram.

Referring back to FIG. 7, in step S2040, the position/orientation calculation unit 260 calculates the position and orientation of the imaging apparatus 200 relative to the reference coordinate system based on the straight line detection result in step S2020 and the azimuth angle candidate value in step S2030.

Figure 11:
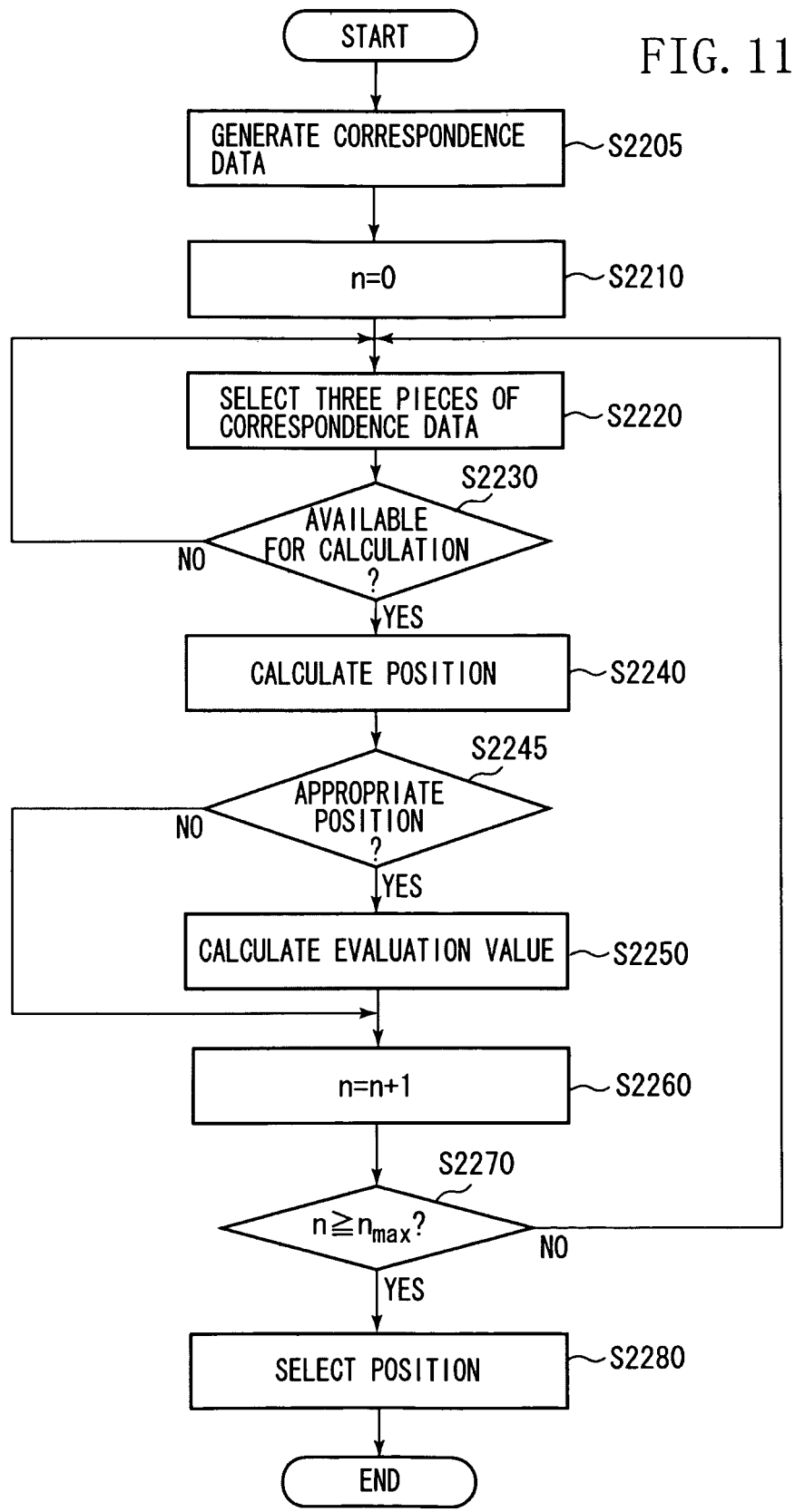
FIG. 11 is a flowchart illustrating a detailed procedure of position/orientation calculation processing.

FIG. 11 is a flowchart illustrating an example procedure of the position/orientation calculation processing performed in step S2040. In step S2040, the position/orientation calculation unit 260 sets the number $n_{max}$ of hypotheses to be verified, and calculates the position of the imaging apparatus 200 by selecting the most appropriate position from among $n_{max}$ combinations of three straight lines.

In step S2205, the position/orientation calculation unit 260 creates a correspondence data list. The correspondence data is a one-to-one combination of the straight line l on an image and the line segment L in a three-dimensional geometric model. The correspondence data list can store a plurality of correspondence data. The correspondence data list includes correspondence data representing all combinations having possible correspondence between straight lines on an image and line segments in a three-dimensional geometric model. An exemplary embodiment can generate a combination from combinations of straight lines on an image voted for an azimuth angle candidate and direction vectors when the azimuth angle candidate is calculated in step S2030.

FIG. 12 illustrates an example correspondence data list. As illustrated in FIG. 9, two or more line segments are classified into the same direction vector. FIG. 12 illustrates a plurality of line segments correlated to one straight line on an image and stored in the correspondence data list.

In step S2210, the position/orientation calculation unit 260 sets the number "n" of proven hypotheses to 0. In step S2220, the position/orientation calculation unit 260 extracts three pieces of correspondence data at random from the correspondence data list generated in step S2205. According to an exemplary embodiment, instead of performing data extraction at random, the position/orientation calculation unit 260 can obtain the position for all of the $n_{max}$ combinations.

In step S2230, the position/orientation calculation unit 260 determines whether the three pieces of correspondence data extracted in step S2220 are available for position calculation. More specifically, the position/orientation calculation unit 260 determines that the three pieces of correspondence data extracted in step S2220 are unavailable for position calculation in the following cases:

a case where straight lines on the same image are included;
    a case where the same line segments are selected;
    a case where three line segments are parallel to each other;
    a case where three line segments intersect at the same point; and
    a case where the combination is previously used.

To determine whether the selected three line segments are parallel to each other or intersect at the same point, the position/orientation calculation unit 260 can set simultaneous equations of formula (17) and formula (18) and determine whether the rank of the coefficient matrix is equal to or less than 3. If the position/orientation calculation unit 260 determines that the three pieces of correspondence data extracted in step S2220 are available for position calculation (YES in step S2230), the processing proceeds to step S2240. If the position/orientation calculation unit 260 determines that the three pieces of correspondence data extracted in step S2220 are unavailable for position calculation (NO in step S2230), the position/orientation calculation unit 260 newly extracts three pieces of correspondence data in step S2220.

In step S2240, the position/orientation calculation unit 260 calculates the position of the imaging apparatus 200. Similar to the modified embodiment 1-2, the position/orientation calculation unit 260 calculates the position $t_{cw}=[t_x t_y t_z]^t$ by solving a plurality of simultaneous equations defined by formula (17) or formula (18) after calculating the rotation matrix $R_{wc}$ representing the orientation of the imaging apparatus 100 based on an angle-of-inclination measurement value obtained by the inclination sensor and an azimuth angle candidate value.

In step S2245, the position/orientation calculation unit 260 evaluates the validity (appropriateness) of a calculated position/orientation. First, the position/orientation calculation unit 260 virtually projects three line segments used in the position calculation on an image by referring to the calculated position/orientation. Furthermore, to handle hidden line removal, the position/orientation calculation unit 260 renders surfaces constituting a three-dimensional geometric model on a depth map. Then, if at least one of the following three conditions is satisfied, the position/orientation calculation unit 260 determines that the calculated position and orientation are not appropriate. In this case (NO in step S2245), the processing proceeds to step S2260. If the position/orientation calculation unit 260 determines that the calculated position and orientation are appropriate (YES in step S2245), the processing proceeds to step S2250.

The conditions used in step S2245 are as follows:

Condition 1: the distance between a projected line segment and one of the passing points (end points of line segment) of a corresponding straight line on an image exceeds a threshold value.

Condition 2: a projected line segment does not overlap a corresponding line segment on an image.

Condition 3: the depth of a point on a line segment in a three-dimensional geometric model corresponding to a passing point of a straight line on an image is greater than the depth on the depth map.

In step S2250, the position/orientation calculation unit 260 calculates an evaluation value of the position calculated in step S2240. In an example embodiment, the position/orientation calculation unit 260 virtually projects all of the line segments in a three-dimensional geometric model on an image by referring to the calculated position and orientation of the imaging apparatus 200 and determines whether straight lines detected on the image are present in the vicinity of the projected line segments.

Then, the position/orientation calculation unit 260 designates the number of three-dimensional geometric models, in which straight lines detected on the image are present in the vicinity of the projected line segments, as an evaluation value of the position. An exemplary embodiment uses the depth map rendered in step S2245 and does not render any line segment hidden by surfaces. The position/orientation calculation unit 260 determines that a projection line segment in a three-dimensional geometric model is present in the vicinity of a straight line on an image if the distance between the projected line segment and both ends of the straight line is less than a predetermined value.

In step S2260, the position/orientation calculation unit 260 increments the number "n" of proven hypotheses by 1. In step S2270, the position/orientation calculation unit 260 determines whether "n" is equal to or greater than $n_{max}$. If the position/orientation calculation unit 260 determines that "n" is equal to or greater than $n_{max}$ (YES in step S2270), the processing proceeds to step S2280. If the position/orientation calculation unit 260 determines that "n" is less than $n_{max}$ (NO in step S2270), the position/orientation calculation unit 260 newly selects three pieces of correspondence data in step S2220.

In step S2280, the position/orientation calculation unit 260 selects the most appropriate position from among the calculated $n_{max}$ positions of the imaging apparatus 200. The position/orientation calculation unit 260 can refer to the evaluation value calculated in step S2250 to determine the most appropriate position.

As described above, when correspondences between straight lines detected on an image and line segments in a three-dimensional geometric model are unknown, the second exemplary embodiment uses an angle-of-inclination measurement value to obtain an azimuth angle candidate value and a correspondence candidate and calculates the position and orientation of an imaging apparatus. The second exemplary embodiment performs azimuth angle candidate value calculation by voting for an azimuth angle that can be obtained by using a method capable of reducing a processing load, and improves efficiency in the position/orientation calculation processing by limiting the number of correspondences between obtained straight lines on the image and direction vectors in a three-dimensional geometric model.

Modified Embodiment 2-1

The above-described second exemplary embodiment virtually projects all of the line segments in a three-dimensional geometric model on an image based on calculated position/orientation data of an imaging apparatus and obtains an evaluation value of the position that represents the number of three-dimensional geometric models having straight lines detected on an image in the vicinity of the projected line segments.

However, the evaluation value is a discrete value representing the number of straight lines. Therefore, if two evaluation values are the same, the result of comparison is undetermined. Therefore, in addition to the number of straight lines, an exemplary embodiment stores an additional evaluation value representing a sum $(d_1+d_2)$ of distances $d_1$ and $d_2$ between a projected line segment and both ends of a straight line illustrated in FIGS. 13A through 13D.

As illustrated in FIG. 13A, if the position of a projected line segment L' corresponding to both ends of straight line l on an image is outside the straight line l, an exemplary embodiment draws a perpendicular from each end point of the projected line segment L' to the straight line l and obtains a sum of lengths of the perpendiculars as a distance. Instead of obtaining a sum of distances $d_1$ and $d_2$, an exemplary embodiment can calculate an evaluation value representing an area surrounded by a straight line, a line segment, and perpendiculars drawn from end points of them as indicated by a hatched region in FIGS. 13A through 13D.

Then, in selecting the most appropriate position, an exemplary embodiment selects the position of a candidate considering the number of straight lines positioned close to projected line segments in a three-dimensional geometric model and selects and outputs a position having the smallest sum of distances from both ends of a straight line to a projection line segment. Alternatively, an exemplary embodiment can select the position based on only the sum of distances from both ends of a straight line to a projection line segment.

Furthermore, the processing load of the above-described evaluation value calculation is relatively small and suitable for numerous calculations. In general, the calculation processing load and the evaluation accuracy is in a trade-off relationship. Hence, after completing the selection of position/orientation data limited based on the above-described evaluation value, an exemplary embodiment can select a final solution with respect to the position/orientation based on an evaluation value having higher accuracy in evaluation. Thus, an exemplary embodiment can increase the possibility of accurately selecting position/orientation data without increasing the processing load in calculation.

Figure 16:
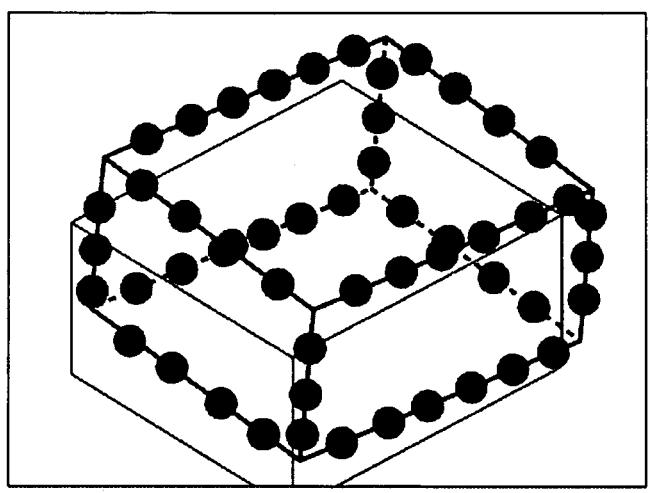
FIG. 16 illustrates example division points of a three-dimensional model on an image.

As another evaluation value determination method, an exemplary embodiment determines an evaluation value by checking whether an edge is actually present near each point of a line segment projected on an image based on calculated position/orientation data of an imaging apparatus. More specifically, as illustrated in FIG. 16, an exemplary embodiment sets division points on a line segment projected on an image such that the division points are disposed at equal intervals on the image. Then, the exemplary embodiment searches an edge located near each division point and counts the number of division points located close to the edge. Then, the exemplary embodiment sets a ratio of the number of division points located close to the edge to the total number of division points as an evaluation value of the position/orientation. In this case, an exemplary embodiment can perform edge search using edge information detected in step S2020 or can perform edge detection again in the vicinity of each division point on a captured image.

Modified Embodiment 2-2

The above-described second exemplary embodiment performs voting for a class having the closest representative value in the azimuth angle histogram. However, due to detection error of a straight line on an image or sensor measurement error, the accuracy of a calculated azimuth angle may be insufficient. Therefore, in addition to voting for a class having the closest representative value, an exemplary embodiment can simultaneously vote for a peripheral class. Furthermore, instead of uniformly incrementing the frequency of a peripheral class by 1, an exemplary embodiment can use a weighting factor such that a result of voting reflects a difference from a calculated azimuth angle. Furthermore, an exemplary embodiment can calculate an azimuth angle based on an actual direction vector of line segments classified into a specific direction vector and determine a range of voting.

Modified Embodiment 2-3

The above-described second exemplary embodiment cannot calculate the azimuth angle of a direction vector parallel to the vertical direction because the left side of formula (16) becomes 0. Therefore, the second exemplary embodiment does not utilize the information relating to a line segment having a direction vector parallel to the vertical direction for following position calculation.

However, if both the left side of formula (16) and the right side of formula (16) become 0, a straight line on an image may correspond to a direction vector parallel to the vertical direction. Hence, an exemplary embodiment can add such correspondences to the correspondence data list and utilize the information relating to a line segment having a direction vector parallel to the vertical direction for position calculation.

Modified Embodiment 2-4

The above-described second exemplary embodiment calculates an azimuth angle for all of the line segments detected on an image while combining them with direction vectors. However, the processing load in calculation increases if numerous line segments are detected on an image. Therefore, instead of using all of the detected line segments, an exemplary embodiment extracts some of the detected line segments at random, calculates an azimuth angle while correlating it with a direction vector, and performs voting. Thus, an exemplary embodiment can prevent the processing load in calculation from increasing excessively.

Modified Embodiment 2-5

The above-described second exemplary embodiment calculates an azimuth angle based on only one correspondence and performs voting. However, an exemplary embodiment can perform azimuth angle calculation and voting based on a plurality of correspondences. For example, an exemplary embodiment can generate a set of combinations of line segments detected on an image and all direction vectors, extract k (e.g., 2) combinations from the generated set of combinations at random, and performs azimuth angle calculation and voting by solving simultaneous equations defined by k formulae (16).

Modified Embodiment 2-6

The above-described second exemplary embodiment calculates an azimuth angle candidate value beforehand and regards the azimuth angle as a known value when the position is calculated. However, the azimuth angle candidate value is a discrete value when the azimuth angle candidate value is a representative value of a class in the azimuth angle histogram. The azimuth angle candidate value may deviate from an actual azimuth angle by an amount equivalent to a quantization step.

Therefore, instead of calculating the position based on only three extracted correspondences, an exemplary embodiment calculates correction values for the position and the azimuth angle. In this case, an exemplary embodiment can use the following formulae (20) and (21), which are obtained by linearizing formula (7) and formula (8) in the vicinity of an azimuth angle candidate value $\theta_0$.

$$\{(n^t r_3 p_x = n^t r_1 p_z)\cos\theta_0 - (n^t r_1 p_x + n^t r_3 p_z)\sin\theta_0\}\Delta\theta + n_x t_x + n_y t_y + n_z t_s = e_p \quad (20)$$

$$\{(n^t r_3 q_x - n^t r_1 q_z)\cos\theta_0 - (n^t r_1 q_x + n^t r_3 q_z)\sin\theta_0\}\Delta\theta + n_x t_x + n_y t_y + n_z t_z = e_q \quad (21)$$

In formulae (20) and (21), $$e_p = -n^t r_2 p_y - \{(n^t r_1 p_x + n^t r_3 p_z)\cos\theta_0 + (n^t r_3 p_x - n^t r_1 p_z)\sin\theta_0\}$$

$$e_q = -n^t r_2 p_y - \{(n^t r_1 q_x + n^t r_3 q_s)\cos\theta_0 + (n^t r_3 q_x - n^t r_1 q_s)\sin\theta_0\}$$

An exemplary embodiment can set simultaneous equations defined by formulae (20) and (21) from three correspondences and solve the equations including unknown variables $\Delta\theta$, $t_x$, $t_y$, and $t_z$. In this case, the azimuth angle is $\theta = \theta + \Delta\theta$.

Modified Embodiment 2-7

The above-described second exemplary embodiment selects a representative value of a class having the largest frequency in the azimuth angle histogram as an azimuth angle candidate value. However, the azimuth angle candidate value is not limited to only one value. Therefore, an exemplary embodiment can select a plurality of azimuth angles ranked in order of the number of votes as azimuth angle candidate values. For example, an exemplary embodiment calculates the position by performing the processing of step S2040 on each azimuth angle candidate value and then outputs a position having the highest evaluation value together with an azimuth angle used in the calculation as a final calculation result.

Furthermore, as described in the modified embodiment 2-1, an exemplary embodiment can calculate a plurality of positions for each azimuth angle candidate value, limit the position based on an evaluation value calculated by the processing having a light processing load in calculation, and then determine a final position/orientation based on a different evaluation value.

Modified Embodiment 2-8

The above-described second exemplary embodiment calculates the position of an imaging apparatus for each of a total of $n_{max}$ combinations. However, an exemplary embodiment can stop the processing if a sufficiently good position is detected before completing the calculation for a total of $n_{max}$ combinations and output the detected position as a final result. For example, an exemplary embodiment determines that a detected position is satisfactory if 50% or more of the line segments detected on an image are present in the vicinity of line segments virtually projected on an image based on position/orientation data of an imaging apparatus.

Modified Embodiment 2-9

The above-described second exemplary embodiment calculates an azimuth angle candidate value and then calculates the position based on correspondences between line segments on an image and line segments in a three-dimensional geometric model. However, the position calculation method is not limited to the method described in the above-described second exemplary embodiment.

For example, an exemplary embodiment can calculate the position based on correspondences between corner points on an image detected by a Harris operator and vertices in a three-dimensional geometric model. More specifically, an exemplary embodiment determines the orientation according to the above-described method, calculates a plurality of positions while correlating corner points detected on an image with vertices in a three-dimensional geometric model at random, and selects a position having the highest consistency.

Moreover, an exemplary embodiment can calculate the position according to an eigenspace method using an appearance of the entire image. More specifically, an exemplary embodiment captures numerous images of a real object expressed by a three-dimensional geometric model while changing the position and orientation of an imaging apparatus, and records each image in association with position/orientation data of the imaging apparatus.

Then, the exemplary embodiment obtains eigenspaces of feature vectors from numerous images. The feature vector is a vector representing a value of each pixel on an image. Then, the exemplary embodiment calculates the position by projecting a captured image onto a point in an eigenspace and outputs, as a position to be obtained, a position of an image captured beforehand that is in the vicinity of the projected point and closest in orientation.

Modified Embodiment 2-10

The above-described second exemplary embodiment obtains the angle of inclination of an imaging apparatus with a sensor and calculates the position and the azimuth angle as unknown variables. However, if the position of an imaging apparatus is known beforehand by using an optical position sensor, only the azimuth angle is an unknown variable. In such a case, the position calculation processing performed in step S2040 can be omitted.

Modified Embodiment 2-11

The above-described second exemplary embodiment calculates the azimuth angle and the position of an imaging apparatus as unknown values. However, if it is known that the azimuth angle or the position is within a predetermined range, an exemplary embodiment can discard a calculation result if a calculated azimuth angle or position is out of the predetermined range.

Third Exemplary Embodiment

The third exemplary embodiment uses the position/orientation measuring method according to the present invention as an initialization method for the position/orientation measuring method based on edge detection discussed in literature 1. In an exemplary embodiment, the initialization is defined as calculating predicted position/orientation values in the position/orientation measurement based on edge detection using only the present frame information in the measurement for the first frame or in an event of measurement failure. The position/orientation measuring apparatus stores a flag F that indicates a failure state or an initial state. In the initial state, the flag F is set to TRUE.

Figure 14:
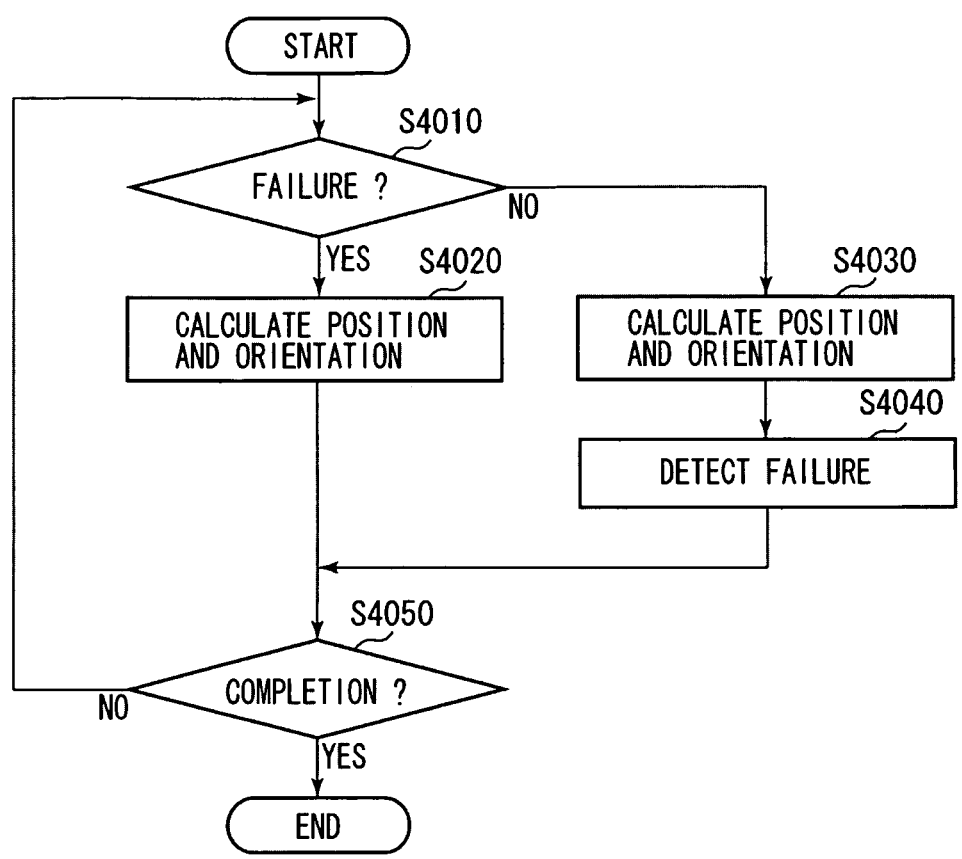
FIG. 14 is a flowchart illustrating a processing procedure according to a third exemplary embodiment of the present invention.

FIG. 14 is a flowchart illustrating an example processing procedure according to the third exemplary embodiment. In step S4010, the position/orientation measuring apparatus refers to the flag F and determines whether the present position/orientation measurement state is in an initial state or in an immediately-after-failure state. If the position/orientation measuring apparatus determines that the present position/orientation measurement state is in an initial state or in an immediately-after-failure state (YES in step S4010), the processing proceeds to step S4020. If the position/orientation measuring apparatus determines that the present position/orientation measurement state is neither in an initial state nor in an immediately-after-failure state (NO in step S4010), the processing proceeds to step S4030.

In step S4020, the position/orientation measuring apparatus measures the position and orientation of an imaging apparatus according to the method described in the second exemplary embodiment and sets the flag F to FALSE. Then, the processing proceeds to step S4050.

In step S4030, the position/orientation measuring apparatus performs the position/orientation measurement discussed in literature 1, which can detect the position and orientation of an imaging apparatus based on detected edges. In step S4030, the position/orientation measuring apparatus performs the following processing.

1. As illustrated in FIGS. 15A and 15B, the position/orientation measuring apparatus projects line segments in a three-dimensional geometric model on an image, based on predicted position/orientation values of the imaging apparatus and intrinsic camera parameters corrected beforehand. FIG. 15A illustrates an image captured by an imaging apparatus. FIG. 15B illustrates a combined image of projected line segments in a three-dimensional geometric model (indicated by bold lines and dotted lines (corresponding to hidden portions)) superimposed on the image captured by the imaging apparatus.

Figure 17A:
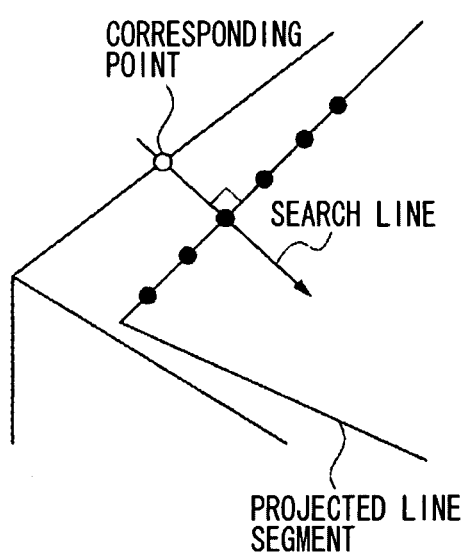
FIGS. 17A and 17B illustrate an example edge detection method.
Figure 17B:
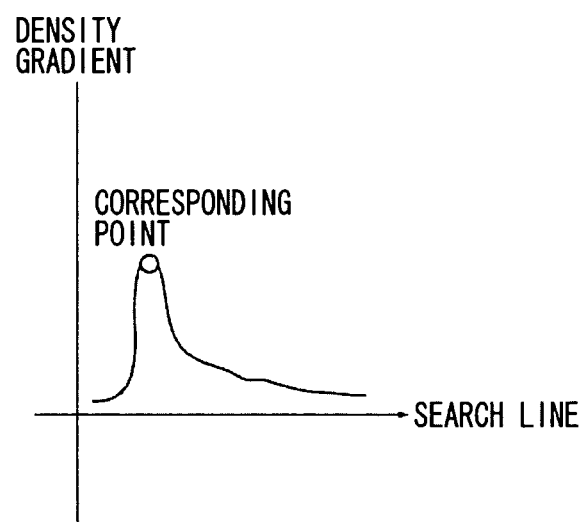

2. The position/orientation measuring apparatus divides each projected line segment at equal intervals on the image and sets a plurality of division points (FIG. 16). Then, the position/orientation measuring apparatus performs edge search for each division point on a line segment (search line) that passes the division point and is normal to the projected line segment and detects, as a corresponding edge, a point that has a maximum gradient value in the luminance value on the search line and is closest to the division point (FIGS. 17A and 17B).

3. The position/orientation measuring apparatus calculates correction values for the position/orientation values of the imaging apparatus that can minimize a sum of distances between corresponding edges detected for respective division point and the projected line segment on the image, and corrects the position and orientation of the imaging apparatus.

4. The position/orientation measuring apparatus performs optimization by repeating the calculation processing described in the above paragraph 3.

If the position/orientation measuring apparatus completes the processing in step S4030, the processing proceeds to step S4040. In step S4040, the position/orientation measuring apparatus performs failure detection. In an exemplary embodiment, the position/orientation measuring apparatus determines whether there is any failure in the position/orientation measurement. For example, the position/orientation measuring apparatus performs the failure detection based on the distance between a line segment projected on an image based on the calculated position/orientation and the edge detected in the above-described step S4030.

More specifically, the position/orientation measuring apparatus determines that the position/orientation measurement has failed if a predetermined number of edges satisfy the condition that the distance between the projected line segment and the corresponding detected edge is equal to or greater than a predetermined threshold value. The position/orientation measuring apparatus sets the flag F to TRUE if any failure is detected in step S4040. If the position/orientation measuring apparatus completes the processing in step S4040, the processing proceeds to step S4050.

In step S4050, the position/orientation measuring apparatus determines whether the position/orientation measurement has been completed. If the position/orientation measuring apparatus determines that the position/orientation measurement is not completed (NO in step S4050), the processing returns to step S4010.

As described above, the third exemplary embodiment can automate the initialization for the position/orientation measuring method based on edge detection by using the position/orientation measuring method described in the above-described exemplary embodiments as an initialization method for the position/orientation measuring method based on edge detection.

Other Exemplary Embodiment

In the above-described exemplary embodiments, an inclination sensor is mounted on an imaging apparatus to measure the angle of inclination of the imaging apparatus. However, a sensor that measures the angle of inclination is not limited to an inclination sensor. Any other sensor capable of measuring the angle of inclination can be used. For example, if an orientation sensor having three degrees of freedom is mounted on an imaging apparatus, an angle-of-inclination component can be extracted from a measured orientation value and can be used as an angle-of-inclination measurement value.

Furthermore, the first exemplary embodiment calculates the position and the azimuth angle of an imaging apparatus as unknown variables. However, if the above-described orientation sensor having three degrees of freedom is used (i.e., when the azimuth angle is not unknown), an exemplary embodiment can obtain correction values for the position and azimuth angle measurement values of an imaging apparatus. An exemplary embodiment can use a method similar to that described in the modified embodiment 2-6 to calculate correction values for the position and the azimuth angle. Furthermore, if the azimuth angle measured by the above-described orientation sensor having three degrees of freedom has higher accuracy, an exemplary embodiment can calculate only the position of an imaging apparatus. The method described in the modified embodiment 1-2 can be used to calculate the position.

The above-described exemplary embodiments use a single imaging apparatus. However, the present invention can be applied to a system including two or more imaging apparatuses whose relative relationship in position and orientation is fixed and known beforehand. An exemplary embodiment can use a second imaging apparatus in addition to the imaging apparatus 100 to perform position/orientation measurement. The inclination sensor 105 measures the angle of inclination of the imaging apparatus 100. When a three-dimensional vector $t_{C1W}$ represents the origin of the reference coordinate system relative to the imaging apparatus 100 and a 3×3 rotation matrix $R_{C1W}$ represents the orientation of the reference coordinate system, the following equation defines the conversion from the reference coordinate system $x_w$ into the coordinate system $x_{C1}$ of the imaging apparatus 100.

$$x_{C1} = R_{C1W} x_w + t_{C1W}$$

When a three-dimensional vector $t_{C2C1}$ represents the position of the imaging apparatus 100 relative to the second imaging apparatus and a 3×3 rotation matrix $R_{C2C1}$ represents the orientation, the following formula (22) defines the conversion from the reference coordinate system $x_w$ into the coordinate system $x_{C2}$ of the second imaging apparatus.

$$\begin{aligned} x_{c_2} &= R_{c_2 c_1} x_{c_1} + t_{c_2 c_1} \\ &= R_{c_2 c_1}(R_{c_1 w} x_w + t_{c_1 w}) + t_{c_2 c_1} \\ &= R_{c_2 c_1} R_{c_1 w} x_w + R_{c_2 c_1} t_{c_1 w} + t_{c_2 c_1} \end{aligned} \quad (22)$$

Similar to formula (2) through formula (4) derived in the first exemplary embodiment, points P and q on the straight line L in the reference coordinate system and the direction vector d (=q−p) of the straight line L in the reference coordinate system satisfy the following relationships.

$$n \cdot (R_{C2C1} R_{C1W} p + R_{C2C1} t_{C1W} + t_{C2C1}) = 0 \quad (23)$$

$$n \cdot (R_{C2C1} R_{C1W} q + R_{C2C1} t_{C1W} + t_{C2C1}) = 0 \quad (24)$$

$$n \cdot R_{C2C1} R_{C1W} d = 0 \quad (25)$$

In formulae (23) through (25), "n" represents a normal vector on a plane passing through the straight line L and a viewpoint position of the second imaging apparatus. When $n=[n_x n_y n_z]^t$, $p=[p_x,p_y,p_z]^t$, $q=[q_x,q_y,q_z]^t$, $d=[d_x,d_y,d_z]^t$, and $t_{cw}=[t_x,t_y,t_z]^t$, the following formulae (26) and (27) can be derived.

$$(n^t r_1' p_x + n^t r_3' p_z)\alpha + (n^t r_3' p_x - n^t r_1' p_z)\beta + n^t R_1 t_x + n^t R_2 t_y + n^t R_3 t_z = -n^t r_2' p_y - n^t t_{c_2 c_1} \quad (26)$$

$$(n^t r_1' q_x + n^t r_3' q_z)\alpha + (n^t r_3' q_x - n^t r_1' q_s)\beta + n^t R_1 t_x + n^t R_2 t_y + n^t R_3 t_z = -n^t r_2' q_y - n^t t_{c_2 c_1} \quad (27)$$

In formulae (26) and (27), $$r' = R_{c_2 c_1}(R_{wc}^i)^{-1} = [r_1' r_2' r_3']$$

$$R_{c_2 c_1} = [R_1 R_2 R_3]$$

and $R_1$, $R_2$, and $R_3$ are vectors representing columns of $R_{C2C1}$.

An exemplary embodiment can calculate the azimuth angle and the position by solving simultaneous equations including α, β, $t_x$, $t_y$, and $t_z$ defined by formula (26), formula (27), formula (7), and formula (8), even when the system includes a plurality of imaging apparatuses.

In the above-described exemplary embodiments, an inclination sensor is mounted on an imaging apparatus to measure the position and orientation of the imaging apparatus relative to a viewing object. However, the present invention is not limited to the above-described exemplary embodiments. For example, if an inclination sensor is mounted on a viewing object that can move, an exemplary embodiment can measure the position and orientation of the viewing object based on an image captured by an imaging apparatus that is stationary in the reference coordinate system.

When a three-dimensional vector $t_{co}$ represents the position of the viewing object in the coordinate system of the imaging apparatus and a 3×3 rotation matrix $R_{wo}$ represents the orientation of the viewing object in the reference coordinate system, the following equation defines the conversion from the coordinate system $x_o$ of the viewing object into the coordinate system $x_c$ of the imaging apparatus.

$$x_o = R_{CW} R_{WO} x_O + t_{CO}$$

In the above equation, $R_{cw}$ is a 3×3 rotation matrix representing the orientation of the reference coordinate system relative to the coordinate system of the imaging apparatus. The 3×3 rotation matrix $R_{wo}$ representing the orientation of the viewing object satisfies a relationship defined by $R_{wo} = R_{wo}^a R_{wo}^i$, when $R_{wo}^i$ is a 3×3 rotation matrix representing an angle-of-inclination component and $R_{wo}^a$ is a 3×3 rotation matrix representing an azimuth angle component. The 3×3 rotation matrix $R_{wo}^i$ can be obtained based on a measurement value of the inclination sensor mounted on the viewing object.

Similar to formula (2) through formula (4) derived in the first exemplary embodiment, points P and q on the straight line L in the object coordinate system and the direction vector d (=q−p) of the straight line L in the object coordinate system satisfy the following relationships:

$$n \cdot (R_{CW} R_{WO} p + t_{CO}) = 0 \quad (28)$$

$$n \cdot (R_{CW} R_{WO} q + t_{CO}) = 0 \quad (29)$$

$$n \cdot R_{CW} R_{WO} d = 0 \quad (30)$$

In formulae (28), (29), and (30), "n" represents a normal vector on a plane passing through the straight line L and the viewpoint position of the imaging apparatus.
If the following relationships are satisfied, $$n = [n_x, n_y, n_z]^t,$$

$$p' = [p'_x, p'_y, p'_z]^t = R_{wo}^i p,$$

$$q' = [q'_x, q'_y, q'_z]^t = R_{wo}^i q,$$

$$d' = [d'_x, d'_y, d'_z]^t = R_{wo}^i d,$$

$$t_{co} = [t_x, t_y, t_z]^t$$

the following formulae (31), (32), and (33) can be derived.

$$(n^t R_1 p_x' + n^t R_3 p_z')\alpha + (n^t R_3 p_x' - n^t R_1 p_z')\beta + n_x t_x + n_y t_y + n_z t_z = -n^t R_3 p_y' \quad (31)$$

$$(n^t R_1 q_x' + n^t R_3 q_z')\alpha + (n^t R_3 q_x' - n^t R_1 q_z')\beta + n_x t_x + n_y t_y + n_z t_z = -n^t R_2 q_y' \quad (32)$$

$$(n^t R_1 d_x' + n^t R_3 d_z')\alpha + (n^t R_3 d_x' - n^t R_1 d_z')\beta = -n^t R_2 d_y' \quad (33)$$

In the above-described relationships, $R_{cw}=[R_1 R_2 R_3]$, the azimuth angle is $\theta$, $\alpha=\cos\theta$, and $\beta=\sin\theta$.

When formula (31), formula (32), and formula (33) are used, the above-described exemplary embodiment can be applied to measurement of the position and orientation of a moving object. Furthermore, similar to the above-described exemplary embodiments, the present invention can be applied to a system including two or more imaging apparatuses that are stationary in the reference coordinate system.

In the above-described exemplary embodiments, an inclination sensor is mounted on an imaging apparatus to measure the position and orientation of the imaging apparatus relative to a viewing object. However, the present invention is not limited to the above-described exemplary embodiments. An exemplary embodiment can use an inclination sensor mounted on a viewing object that can move and an inclination sensor mounted on an imaging apparatus to measure a relative relationship in position and orientation between the viewing object and the imaging apparatus.

When a 3×3 rotation matrix $R_{cw}$ represents the orientation of the reference coordinate system in the coordinate system of the imaging apparatus, a 3×3 rotation matrix $R_{wo}$ represents the orientation of the viewing object in the reference coordinate system, and a three-dimensional vector $t_{co}$ represents the position of the viewing object in the coordinate system of the imaging apparatus, the following equation defines the conversion from the coordinate system $x_o$ of the viewing object into the coordinate system $x_c$ of the imaging apparatus.

$$x_o = R_{CW} R_{WO} x_O + t_{CO}$$

The 3×3 rotation matrix $R_{wo}$ satisfies a relationship defined by $R_{wo} = R_{wo}^a R_{wo}^i$ when a 3×3 rotation matrix $R_{wo}^i$ represents an angle-of-inclination component and a 3×3 rotation matrix $R_{wo}^a$ represents an azimuth angle component.

Furthermore, the 3×3 rotation matrix $R_{cw}$ satisfies a relationship defined by $R_{cw} = (R_{wc}^i)^{-1}(R_{wc}^a)^{-1}$ when a 3×3 rotation matrix $R_{wc}^i$ represents an angle-of-inclination component and a 3×3 rotation matrix $R_{wc}^a$ represents an azimuth angle component. Thus, the following relationship can be derived.

$$x_c = (R_{wc}^i)^{-1}(R_{wc}^a)^{-1} R_{wo}^a R_{wo}^i x_o + t_{co}$$

In the equation, $(R_{wc}^a)^{-1} R_{wo}^a$ represents a difference in azimuth angle between the viewing object and the imaging apparatus and can be expressed by the following matrix:

$$R^a = (R_{wc}^a)^{-1} R_{wo}^a$$

$$R_{wo}^i, R_{wc}^i$$

can be obtained based on measurement values of the inclination sensors mounted on the viewing object and the imaging apparatus.

Similar to formula (2) through formula (4) derived in the first exemplary embodiment, points P and q on the straight line L in the object coordinate system and the direction vector d (=q-p) of the straight line L in the object coordinate system satisfy the following relationships:

$$n \cdot ((R_{wc}^i)^{-1} R^a R_{wo}^i p + t_{co}) = 0 \quad (34)$$

$$n \cdot ((R_{wc}^i)^{-1} R^a R_{co}^i q + t_{co}) = 0 \quad (35)$$

$$n \cdot ((R_{wc}^i)^{-1} R^a R_{wo}^i d) = 0 \quad (36)$$

In formulae (34) to (36), "n" represents a normal vector on a plane passing through the straight line L and a viewpoint position of the imaging apparatus.

If the following relationship is satisfied, $$n = [n_x n_y n_z]^t,$$

$$p' = [p'_x, p'_y, p'_z]^t = R_{wo}^i p,$$

$$q' = [q'_x, q'_y, q'_z]^t = R_{wo}^i q,$$

$$d' = [d'_x, d'_y, d'_z]^t = R_{wo}^i d,$$

$$t_{co} = [t_x, t_y, t_z]^t$$

the following formulae (37), (38), and (39) can be derived.

$$(n^t r_1 p_x^t + n^t r_3 p_z^t)\alpha + (n^t r_1 p_z^t - n^t r_3 p_z^t)\beta + n_x t_x + n_y t_y + n_z t_z = -n^t r_2 p_y^t \quad (37)$$

$$(n^t r_1 q_x^t + n^t r_3 q_s^t)\alpha + (n^t r_1 q_x^t - n^t r_3 q_s^t)\beta + n_x t_x + n_y t_y + n_z t_z = -n^t r_2 q_y^t \quad (38)$$

$$(n^t r_1 d_x^t + n^t r_3 d_z^t)\alpha + (n^t r_1 d_x^t - n^t r_3 d_z^t)\beta = -n^t r_3 d_y^t \quad (39)$$

In the above-described relationship, the rotational angle of $R^a$ around the y-axis is $\theta$, $\alpha = \cos\theta$, and $\beta = \sin\theta$. When formula (37), formula (38), and formula (39) are used, the above-described exemplary embodiment can be applied to measurement of the position and orientation of a moving object. Furthermore, similar to the above-described exemplary embodiments, the present invention can be applied to a system including two or more imaging apparatuses whose relative position and orientation are fixed in the reference coordinate system and known.

In the above-described first and second exemplary embodiments, the reference coordinate system is set to have the y-axis extending upward in the vertical direction (i.e., opposite direction of the axis of gravity). However, an exemplary embodiment can use a reference coordinate system that is differently defined. If a selected reference coordinate system has the y-axis not extending in the vertical direction, an exemplary embodiment can calculate a relative orientation between the selected coordinate system and the coordinate system having the y-axis extending upward in the vertical direction beforehand, and convert the reference coordinate system into the coordinate system having the y-axis extending upward in the vertical direction.

As described above, exemplary embodiments of the present invention can stabilize the position/orientation measurement of an imaging apparatus or an object that is performed based on an image without using predicted position/orientation values, and can reduce the processing time.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. In this case, the type of program can be any one of object code, interpreter program, and OS script data. Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, an operating system (OS) or other application software running on a computer can execute part or the whole of actual processing based on instructions of the program. Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

For example, in an image input apparatus or an information storage device, or in an integrated system having both image input and information storage functions, a CPU can perform part or the whole of actual processing to realize the functions of the above-described exemplary embodiments.

The image input apparatuses include video cameras, digital cameras, monitor cameras, CCD-equipped cameras and scanners, as well as image input apparatuses capable of converting analog images input from an analog image input apparatus into digital images. The information storage devices include external hard disks and video recorders.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-157609 filed Jun. 14, 2007, which is hereby incorporated by reference herein in its entirety.

What is claimed is:

1. An information processing method comprising:
   acquiring an image of an object captured by an imaging apparatus, wherein a three dimensional geometric model of the object is comprised of a first plurality of line segments;
   acquiring an angle of inclination measured by an inclination sensor mounted on the object or the imaging apparatus;
   detecting a second plurality of line segments from the captured image;
   generating several pairs, each pair consisting of:
      one of the second plurality of line segments, and
      one of the first plurality of line segments;
   calculating azimuth angles based on the angle of inclination and a correspondence between the line segments in each pair, for all of the pairs;
   determining an azimuth angle candidate value from among the calculated azimuth angles; and
   calculating a position and orientation of the object or the imaging apparatus, on which the inclination sensor is mounted, based on the angle of inclination and the determined azimuth angle candidate value.

2. The information processing method according to claim 1, further comprising calculating a position and azimuth angle of the object or the imaging apparatus, on which the inclination sensor is mounted, and determining the orientation based on the azimuth angle and the angle of inclination.

3. The information processing method according to claim 2, further comprising calculating the position after calculating the azimuth angle.

4. The information processing method according to claim 1, further comprising calculating the position and the azimuth angle based on at least three detected straight lines and the first plurality of line segments constituting the three-dimensional geometric model corresponding respectively to the at least three detected straight lines from the second plurality of line segments.

5. The information processing method according to claim 1, further comprising determining the azimuth angle candidate value according to a result of voting for azimuth angles calculated based on the respective pairs.

6. The information processing method according to claim 5, further comprising outputting an azimuth angle having the largest number of votes in said voting as the azimuth angle candidate value.

7. The information processing method according to claim 5, further comprising outputting a plurality of azimuth angles ranked according to the number of votes in said voting as a plurality of azimuth angle candidate values.

8. An information processing apparatus comprising:
   an image input unit configured to input an image of an object captured by an imaging apparatus, wherein a three dimensional geometric model of the object is comprised of a first plurality of line segments;
   an angle-of-inclination input unit configured to input an angle of inclination measured by an inclination sensor mounted on the object or the imaging apparatus;
   a line detection unit configured to detect a second plurality of line segments from the captured image;
   a generation unit configured to generate several pairs, each pair consisting of one of the second plurality of line segments and one of the first plurality of line segments;
   an azimuth calculating unit configured to calculate azimuth angles based on the angle of inclination and a correspondence between the line segments in each pair, for all of the pairs;
   a determination unit configured to determine an azimuth angle candidate value from among the calculated azimuth angles; and
   a calculation unit configured to calculate a position and orientation of the object or the imaging apparatus, on which the inclination sensor is mounted, based on the angle of inclination and the determined azimuth angle candidate value.

9. A non-transitory computer-readable storage medium storing a program for causing a computer to:
   acquire an image of an object captured by an imaging apparatus, wherein a three dimensional geometric model of the object is comprised of a first plurality of line segments;
   acquire an angle of inclination measured by an inclination sensor mounted on the object or the imaging apparatus;
   detect a plurality of line segments from the captured image;
   generate several pairs, each pair consisting of: one of the second plurality of line segments, and one of the first plurality of line segments;
   calculate azimuth angles based on the angle of inclination and a correspondence between the line segments in each pair, for all of the pairs;
   determine an azimuth angle candidate value from among the calculated azimuth angles; and
   calculate a position and orientation of the object or the imaging apparatus, on which the inclination sensor is mounted, based on the angle of inclination and the determined azimuth angle candidate value.

* * * * *